United States Patent
Takeda et al.

(10) Patent No.: US 7,328,014 B2
(45) Date of Patent: Feb. 5, 2008

(54) COMMUNICATION SYSTEM, GATEWAY EQUIPMENT, COMMUNICATION METHOD AND AUTHENTICATION METHOD

(75) Inventors: Yukiko Takeda, Tokorozawa (JP); Hidenori Inouchi, Higashimurayama (JP); Keisuke Takeuchi, Kunitachi (JP); Shinsuke Suzuki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 49 days.

(21) Appl. No.: 10/619,572

(22) Filed: Jul. 16, 2003

(65) Prior Publication Data
US 2004/0179539 A1 Sep. 16, 2004

(30) Foreign Application Priority Data
Mar. 14, 2003 (JP) ............................. 2003-069722

(51) Int. Cl.
*H04Q 7/20* (2006.01)
*H04L 12/28* (2006.01)
*H04L 12/56* (2006.01)

(52) U.S. Cl. ................................. 455/435.1; 370/407
(58) Field of Classification Search ............. 455/435.1; 370/401
See application file for complete search history.

(56) References Cited
U.S. PATENT DOCUMENTS

| | | | | |
|---|---|---|---|---|
| 2001/0028647 A1* | 10/2001 | Teraoka | ........................ | 370/389 |
| 2002/0059452 A1* | 5/2002 | Yokota et al. | ............... | 709/238 |
| 2002/0199015 A1* | 12/2002 | Tari et al. | .................... | 709/238 |
| 2003/0120766 A1* | 6/2003 | Ishiyama et al. | ............ | 709/223 |
| 2003/0153324 A1* | 8/2003 | Veerepalli et al. | ........... | 455/453 |
| 2003/0217180 A1* | 11/2003 | Chandra et al. | ............. | 709/245 |
| 2004/0081109 A1* | 4/2004 | Oishi | ........................ | 370/310 |
| 2005/0020265 A1* | 1/2005 | Funabiki et al. | ............. | 455/436 |

OTHER PUBLICATIONS

Overview of Mobile IPv6, Johnso, Perkins, Arkko, Expires Apr. 29, 2003, [p. 7], Internet Draft, Mobility Support in IPv6, Oct. 29, 2002.
Internet-Draft, HMIPv6, Oct. 2002, Overview of HMIPv6.
RFC 2373, IPv6 Addressing Architecture, Jul. 1998.
Internet-Draft, Ipv6 Prefix Options for DHCPv6, Nov. 2002.
3GPP2: "Wireless IP Network Standard" 3GPP2, Online, Oct. 25, 2002, pp. 1-97.
D. Johnson, et al "Mobility Support in IPv6", draft-ietf-mobileip-ipv 6-21.txt, Feb. 26, 2003, pp. 1,57,58,102 and 103.

* cited by examiner

*Primary Examiner*—William Trost
*Assistant Examiner*—Marivelisse Santiago-Cordero
(74) *Attorney, Agent, or Firm*—Mattingly, Stanger, Malur & Brundidge, P.C.

(57) ABSTRACT

A communication method and system allowing MN (mobile nodes) to acquire a home address in a visited network. The communication system includes a home network installed with a home agent for holding mobile terminal location information and, a visited network installed with a radio communications device for communicating with that mobile terminal, and gateway equipment in the visited network for forming an interface with the home network. The radio communication device includes an access request transfer unit for forwarding access requests from a mobile terminal of the visited network to the gateway equipment which makes an acquisition request to the home agent for an identifier of that mobile terminal, and forwards that acquired identifier to that mobile terminal.

22 Claims, 24 Drawing Sheets

FIG.3

330 BINDING CACHE MANAGEMENT TABLE

| 331 HOME ADDRESS | 332 CARE OF ADDRESS | 333 LIFETIME | |
|---|---|---|---|
| | | | 330-1 |
| | | | 330-2 |
| | | | 330-n |

FIG.4

310 PREFIX MANAGEMENT TABLE(HA)

| 311 DHCP CLIENT IDENTIFIER | 312 IAID | 313 PREFIX | 314 LIFETIME | |
|---|---|---|---|---|
| | | | | 310-1 |
| | | | | 310-2 |
| | | | | 310-n |

FIG.6

320 PREFIX MANAGEMENT TABLE(GW)

| 321 | 322 | 323 | 324 | 325 | |
|---|---|---|---|---|---|
| IA_PD | IAID | PREFIX | LIFETIME | DHCP SERVER IDENTIFIER | |
| | | | | | 320-1 |
| | | | | | 320-2 |
| | | | | | 320-n |

FIG.7

340 ACCEPTABLE IP ADDRESS LIST

| IP ADDRESS (341) | LIFETIME (342) |
|---|---|
|  |  |
|  |  |
|  |  |

350 ZONE FILE

| FQDN (351) | IP ADDRESS (352) |
|---|---|
|  |  |
|  |  |
|  |  |

350-1
350-2
350-n

80 PREFIX DELEGATION PROCESSING ROUTINE(HA)

S1 EXAMPLE OF DHCPv6 PACKET FORMAT

S2 EXAMPLE OF IA_PD OPTIONS FORMAT

S3 EXAMPLE OF IA_PD PREFIX OPTIONS FORMAT

S11 HOME AGENT ADDRESS DISCOVERY REQUEST MESSAGE FORMAT

S12 HOME AGENT ADDRESS DISCOVERY REPLY MESSAGE FORMAT

S13 BINDING UPDATE MESSAGE FORMAT

S14 BINDING ACKNOWLEDGEMENT MESSAGE FORMAT

90 PREFIX REQUEST PROCESSING ROUTINE(GW)

COMMUNICATION SYSTEM, GATEWAY EQUIPMENT, COMMUNICATION METHOD AND AUTHENTICATION METHOD

BACKGROUND OF THE INVENTION

1. Field of the Invention

The present invention relates to a mobile communication system and relates in particular to a mobile communication system, gateway equipment, communication method and mobile terminal authentication method for mobile IP protocol.

2. Description of Related Art

Much intense study of IP (Internet Protocol) for mobile communication networks has been made in recent years.

The IETF (Internet Engineering Task Force) is working on standardized Mobile IPv6 specifications (for example, in non-patent document 1; Mobility Support in IVv6 draft-ieff-mobileip-ipv6-19.txt, Work in Progress).

The elements comprising the Mobile IPv6 network structure are a Mobile Node (MN), a home agent (HA), and a correspondent node (CN).

An IP address (home address serving as identification information for the mobile node) is assigned to the MN. This IP address does not change even when the MN moves. A link having the same prefix as the home address is called the home link. The HA manages MN location information (Binding Cache) located other than in the home link.

When the MN moves to a link (host link) other than the home link (foreign link), the MN acquires the IP address of that link. This address is called the Care of Address (CoA). The MN receives a router advertisement sent periodically by the router in the foreign link. The MN senses movement by detecting a prefix different from the home address.

When the MN detects movement, it registers the location in the HA. The MN contains a Home Agent Address Discovery function capable of dynamically searching for home agent IP addresses.

The MN creates a Mobile IPv6 Home-Agents Anycast Address from the prefix of the home link. The MN sends an ICMP Home Agent Address Discovery Request to that address. That ICMP Home Agent Address Discovery Request signal is sent to the HA in each of the home links. The HA that received the ICMP Home Agent Address Discovery Request sends an ICMP Home Agent Address Discovery Reply containing HA information to the MN. The MN acquires the address of the HA by extracting HA information from the ICMP Home Agent Address Discovery Reply signal. The MN makes a binding update (performs location registration) of the HA address it acquired.

When the HA receives the binding update, it retains the MN home address and the CoA binding information in the binding cache. The HA next acts as a proxy (on behalf of the MN, sending a Gratuitous Neighbor Advertisement to capture packets addressed to the home address of the MN.

The CN (correspondent node) is a peer node with which a MN is communicating.

The procedure used by the CN for sending a packet addressed to the MN is described next.

The CN sends a packet addressed to the MN home address. The HA that received the packet addressed to the MN home address, searches the binding cache, and acquires the CoA matching the MN home address. The HA attaches an IP header for the received packet and sends the encapsulated packet. The Destination Address of the external header is a CoA.

When the CoA addressed packet is received, the MN first removes (decapsulizes) the IP header that was attached and restores the original packet.

The home network might reattach a prefix. The Mobile IPv6 contains a function to notify the MN of the host network of prefix information for the home network. The HA checks the binding cache and notifies the MN in the binding update process with an MPA (Mobile Prefix Advertisement).

Technology for localized management of mobile communication based on Mobile IPv6 has been proposed (for example, in non-patent document 2; Hierarchical Mobile IPv6 mobility management (HMIPv6) draft-ieff-mobileip-hmipv6-07.txt Work in Progress).

The MPIPv6 contains a MAP (Mobile Anchor Point) between the HA and MN. The MAP provides that network with a local HA function. The MAP may also contain an AR (access router) under its control. The MN receives a router advertisement from the AR containing a MAP option, and acquires the IP address of the MAP. The MAP option contains the global address of the MAP, the MAP prefix, the MAP preference, and the number of hops to the MAP, etc. The MAP uses either of the following methods to notify the AR of MAP options.

(1) MAP distributes a router advertisement containing MAP options to the router (AR).

(2) MAP expands the router renumbering function for IPv6 and notifies the AR of the MAP options.

Instead of the MAP informing the AR of the MAP options, the network manager may set the MAP option information in the AR.

The information with the MAP options is stored when a MN compatible with HMIPv6 standards receives the router advertisement containing the MAP options. The MN (compatible with HMIPv6) generates a RCoA (Regional Core of Address) from the MAP prefix contained in the MAP option and the MN interface identifier. The MN also generates an LCoA (on-link CoA) utilizing prefix information contained in the router advertisement. The LCoA is equivalent to the CoA of the Mobile IPv6.

The (HMIPv6 compatible) MN first of all makes a binding update (location registration) on the MAP. The MAP manages the binding information along with the RCoA and LCoA of the MN. The binding update signal that the MN sends to the MAP contains bits showing the MAP binding update (registration information). The MN next performs the binding update in the HA. The HA manages the MN home address and the RCoA of the binding information. When the MN has moved within the MAP, the MN rewrites only the MAP location information.

The IPv6 address is specified in RFC2373. Three types of addresses; unicast, anycast and multicast are defined as IPv6 addresses. The unicast address contains three types (global address, site local address, and link local address) of addresses. The site local address can only be used within the site and is equivalent to an IPv4 private address (for example non-patent document 3).

The IPv6 Prefix Delegation Options for DHCPv6 (DHCP-PD) are also being evaluated. Here, DHCP-PD is a function that makes use of DHCP (Dynamic Host Configuration Protocol) to assign IPv6 prefix (group) to sites from the side handling address assignment. The delegating router and requesting router are the elements that make up the DHCP-PD. The requesting router makes a request to the delegating router to assign an IPv6 prefix (group). The delegating router selects an IPv6 prefix (group) and sends that prefix to the requesting router. This DHCP-PD is used for example by ISP (Internet Service Providers) when assigning a prefix to subscribers (as for example in non-patent document 4).

[Non-Patent Document 1]

D. Johnson and others, Mobility Support in IPv6, [online], Oct. 29, 2002, Internet address www.ieff.org/internet-drafts/draft-ieff-mobileip-ipv6-19.txt

[Non-Patent Document 2]

Claude Castelluccia and others, Hierarchical Mobile IPv6 mobility management (HMIPv6), [online], October 2002, Internet address www.ieff.org/internet-drafts/draft-ieff-mobileip-hmipv6-07.txt

[Non-Patent Document 3]

R. Hinden and others, IP Version 6 Addressing Architecture, [online], July 1988, Internet address www.ieff.org/rfc/rfc2373.txt

[Non-Patent Document 4]

O. Troan and others, IPv6 Prefix Options for DHCPv6, [online], Nov. 27, 2002, Internet address www.ietf.org/internet-drafts/draft-ieff-dhc-dhcpv6-opt-prefix-delegation-01.txt The zone A and zone B are mutually connected and when a mobile node (MN) belonging to zone A has moved to zone B, the HA holding the location information (binding cache) for mobile nodes in zone A functions as a proxy for the MN.

The zone A and the zone B utilize site local addresses so a conflict might arise between the MN home address and the visited network address.

The Mobile IPv6 ensures the arrival of communications at the home address by supplying a permanent IP address (home address) to the MN that does not change even if the MN moves its location. The MN user can change the network settings containing the IP address if the MN is a personal computer, etc. However, when the home address of the MN is changed (rewritten), the problem arises that the arrival of communications at the MN cannot be guaranteed. Methods allowing the MN to acquire the home address have been considered in order to resolve this problem. However, Mobile IPv6 does not contain a function to dynamically assign home addresses to the MN.

The Mobile IPv6 prefix discovery function is provided to the MN registering the location information (binding update) in the HA. So prior to making the binding update (location registration), the MN cannot receive the signal (MPA) notifying it of home network prefix information.

SUMMARY OF THE INVENTION

The present invention has the object of providing a mobile communication method capable of allowing the MN to acquire the home address in the visited network. The present invention in particular has the object of providing a mobile communications method for distributing home address prefix information to a mobile terminal X by utilizing the DHCP-PD function, when the home network of the mobile terminal X with an HA belonging to zone A has moved to zone B.

The present invention has the further object of providing a mobile communication method for a mobile terminal X not performing a binding update (location registration) in the HA, to acquire home address prefix information in zone B.

The present invention has the still further object of providing a mobile communication method to send functions and information required for distributing home address prefix information to a mobile terminal from a network management equipment via HA and gateway equipment of zone B.

The present invention has the yet further object of providing a mobile communication method for starting authentication processing and DHCP-PD functions for the binding update signal the MN sends to the MAP, when the gateway equipment of zone B is an HMIPv6 compatible MAP. A yet further object is to provide a highly safe mobile terminal communication method by having the MAP accept only the binding update request of the MN whose results from authentication processing were approved by the MAP.

The present invention is a communication system comprising a home network installed with a home agent for holding mobile terminal location information and, a visited network installed with a radio communications device for communicating with that mobile terminal, and gateway equipment in the visited network for forming an interface with the home network, wherein the radio communication device contains an access request transfer means for forwarding access requests from a mobile terminal of the visited network to the gateway equipment, and the gateway equipment makes an acquisition request to the home agent for an identifier of that mobile terminal, and forwards that acquired identifier to that mobile terminal.

The present invention is in other words characterized in comprising the following means.

(1) The home agent (HA) contains a means for reporting (notifying) prefix information to a gateway equipment containing a DHCP-PD requesting router function and further contains a delegating router function for the DHCPv6 Prefix Delegation Option (DHCP-PD).

(2) The gateway equipment (GW) belonging to the visited network contains a DHCP-PD requesting router function and an authentication function. The gateway equipment contains a means for requesting the sending of authentication information on a packet transmission source when the gateway equipment receives packets from an un-authenticated transmission source; a means for sending the authentication request to the authentication server when an authentication request is received from the mobile terminal (MN); and a means for requesting distribution of prefix information to an HA containing a DHCP-PD function when determined from the authentication results that the mobile terminal is authentic; and a means to notify the mobile terminal with prefix information when prefix information was received from the HA.

(3) The HA and gateway equipment (GW) further contain a means for receiving the DHCP-PD function described in (1) and (2) from the network management equipment.

(4) The gateway equipment (MAP) may instead contain a means to request distribution of prefix information to the HA when the gateway equipment receives a binding update request from the MN if the gateway equipment contains an HMIPv6 compatible MAP function.

(5) The gateway equipment (MAP) may instead contain a means to approve the binding update only for authenticated MN if the gateway equipment contains an HMIPv6 compatible MAP function.

The present invention is a communication system comprising a home network installed with a home agent for holding mobile terminal location information and, a visited network installed with a radio communications device for communicating with that mobile terminal, and gateway equipment in the visited network for forming an interface with the home network, wherein the radio communication device contains an access request transfer means for forwarding access requests from a mobile terminal of the visited network to the gateway equipment, and the gateway equipment makes an acquisition request to the home agent for an identifier of that mobile terminal, and forwards that acquired identifier to that mobile terminal so that the mobile terminal can acquire the home address in networks (visited networks) other than the home network.

BRIEF DESCRIPTION OF THE DRAWINGS

FIG. 3 is a drawing showing the structure of the binding cache management table contained in the home agent (HA) of the first embodiment of the present invention;

FIG. 4 is a drawing showing the structure of the prefix management table contained in the home agent (HA) of the first embodiment of the present invention;

FIG. 6 is a drawing showing the structure of the prefix management table contained in the gateway equipment (GW) of the first embodiment of the present invention;

FIG. 7 is a drawing showing the structure of the acceptable IP address list contained in the gateway equipment (GW) of the first embodiment of the present invention;

FIG. 8 is a drawing showing the structure of the zone file contained in the DNS server of the first embodiment of the present invention;

DETAILED DESCRIPTION OF THE PREFERRED EMBODIMENTS

The embodiment of the present invention is described next while referring to the accompanying drawings. The method for acquiring the home address when the Mobile IPv6-compatible node (MN) has moved to a network (hereafter visited network) other than the home link (hereafter home network) is described in detail as an example.

Figure 1:
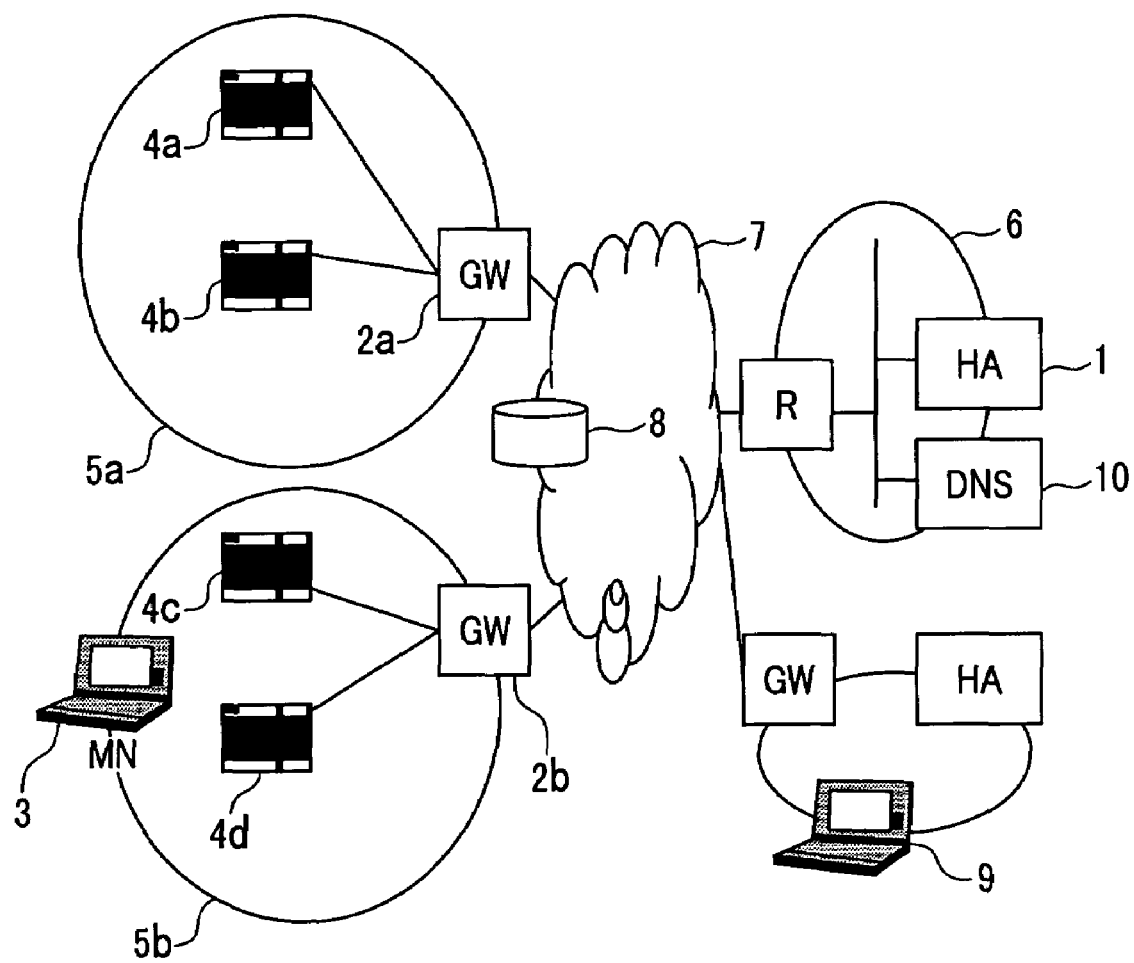
FIG. 1 is a structural view of the communication network of the first embodiment of the present invention.

FIG. 1 is a drawing showing the structure of the communication network of the first embodiment.

The communication network is comprised of an MN3 home network 6, and IP network 7 and a visited network 5 (5a, 5b). In the first embodiment, the home network 6, the IP network 7 and the visited network 5 are an IPv6 network. The MN3 is a mobile node (MN) compatible with Mobile IPv6. The visited network 5 and the IP network 7 are connected by way of gateway equipment (or routers) functioning as connection devices. The IP network 7 and the home network 6 are connected by way of routers (or gateway equipment). The visited network 5 and the home network 6 may also be connected by way of routers or gateway equipment.

The home network 6 is comprised of HA 1 and a DNS server 10. The visited network 5 (5a, 5b) is comprised of a radio communications device (access point) connected to MN3, a router 4 (4a, 4b, 4c, 4d), and a gateway equipment 2 (2a, 2b) functioning as an interface between the visited network 5 and the IP network 7. The IP network 7 is comprised of an authentication server 8. The gateway equipment 2 and the authentication server 8 may be directly connected.

Here, the HA 1 is a home agent (HA) compatible with Mobile IPv6. The HA1 manages the location information other than in the home network 6. The HA1 contains a function to supplement the packet addressed to the MN3 home address that was sent by the other communication terminal (CN) 9, and to forward the packet to the MN3 present within the visited network 5b. The DNS server 10 for example, replies with an IP address to the domain name of MN3 sent from the CN9.

Figure 2:
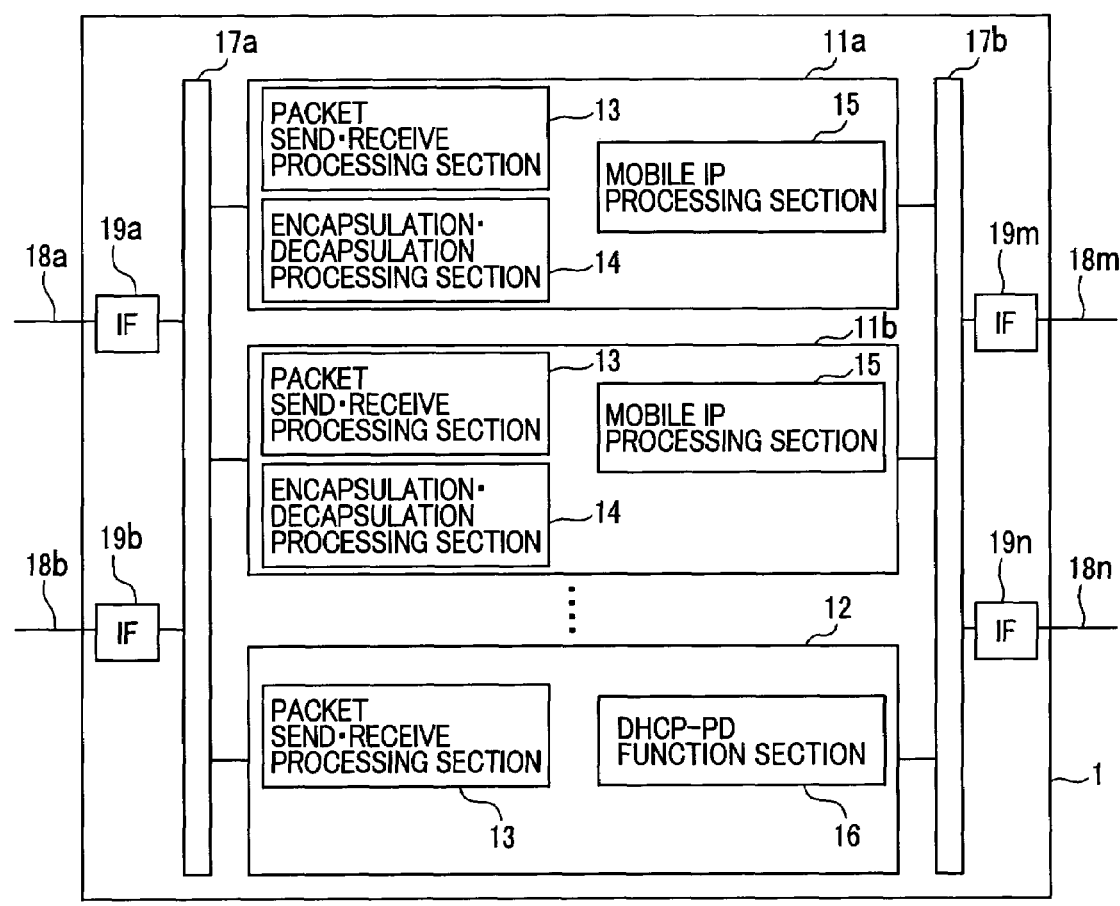
FIG. 2 is a block diagram of the home agent (HA) of the first embodiment of the present invention.

FIG. 2 is a block diagram showing the structure of the home agent (HA) 1 installed in the home network 6.

The HA1 is comprised of an interface section (IF) 19 (19a, 19b, 19m, 19n) containing a server section 11 (11a, 11b), server section 12, and line 18 (18a, 18b, 18m, 18n) as well as a switching section 17 (17a, 17b).

The server section 11 is comprised of a packet send-receive processing section 13, an encapsulation-decapsulation processing section 14, and a Mobile IP processing section 15.

The packet send-receive processing section 13 contains a function to send or receive data packets. The encapsulation-decapsulation processing section 14 contains a function to add or delete the IP header from the data packet. The Mobile IP processing section 15 has a home agent (HA) function for Mobile IPv6 and contains a binding cache management table 330 (FIG. 3).

Figure 12:
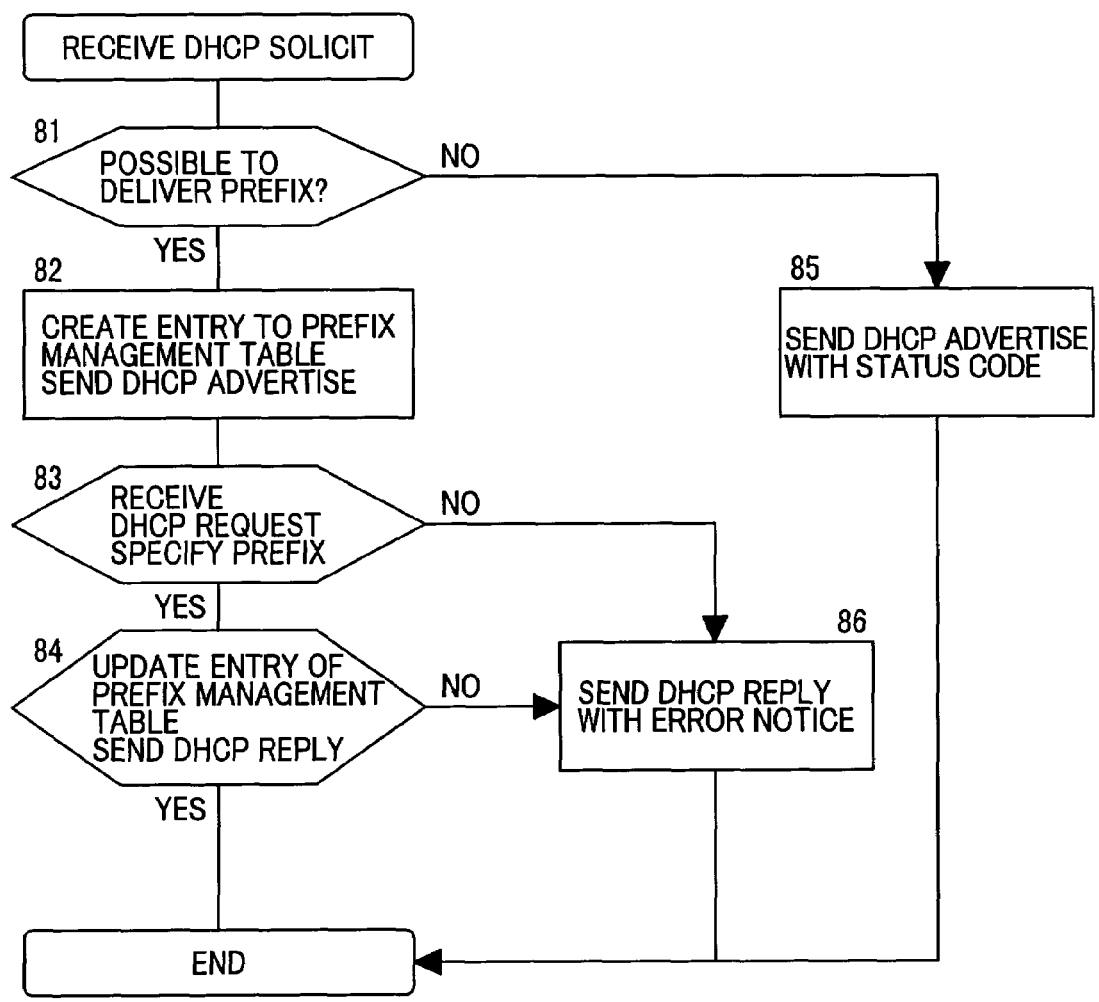
FIG. 12 is a flowchart of the prefix delegation processing routine of the first embodiment of the present invention.

The server section 12 contains the packet send-receive processing section 13 and DHCP-PD function section 16. The DHCP-PD function section 16 is comprised of a delegating router function for DHCP-PD, contains a prefix management table 310 (FIG. 4) and executes the prefix delegation processing routine 80 (FIG. 12).

FIG. 3 is a drawing showing the structure of the binding cache management table.

The binding cache management table 330 matches at least a Care of Address (CoA) 332 acquired in the visited network by MN3 and a lifetime 333 showing the effective period of the binding cache with the MN3 home address 331 and stores them (332 and 333).

FIG. 4 is a drawing showing the structure of the prefix management table 310. The prefix management table 310 matches at least an IAID 312 showing the prefix (group), and a distributed prefix 313, and a lifetime (effective period) 314 of the distributed prefix with the DHCP Client identifier 311 and stores them (312, 313, 314).

Figure 5:
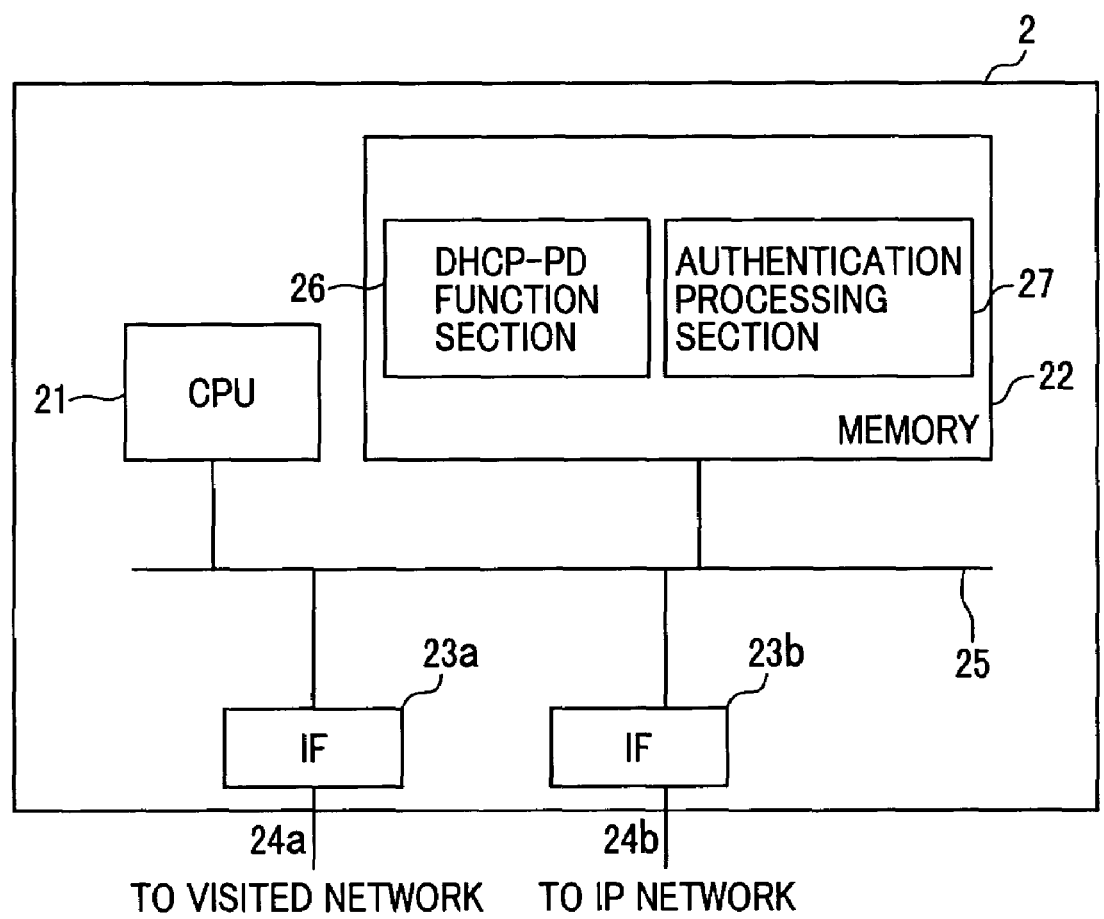
FIG. 5 is a block diagram of the gateway equipment (GW) of the first embodiment of the present invention.

FIG. 5 is a block diagram of the gateway equipment (GW) 2 installed in the visited network 5.

The gateway equipment 2 is comprised of an interface section (IF) 23 (23a, 23b) containing a CPU 21, a memory 22, and a line 24 (24a, 24b) mutually connected to a bus 25.

Figure 10:
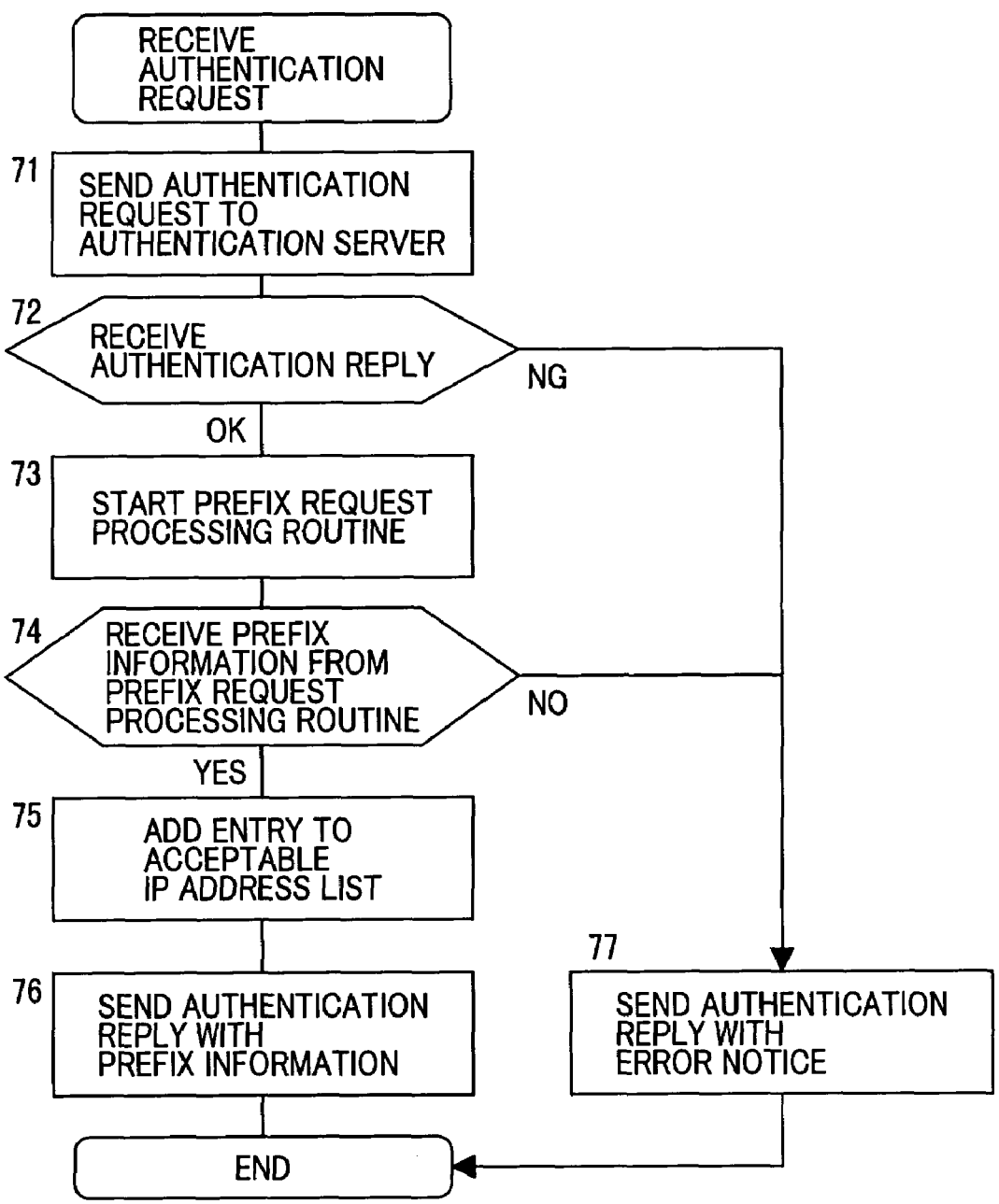
FIG. 10 is a flowchart of the authentication processing routine of the gateway equipment (GW) of the first embodiment of the present invention.
Figure 11:
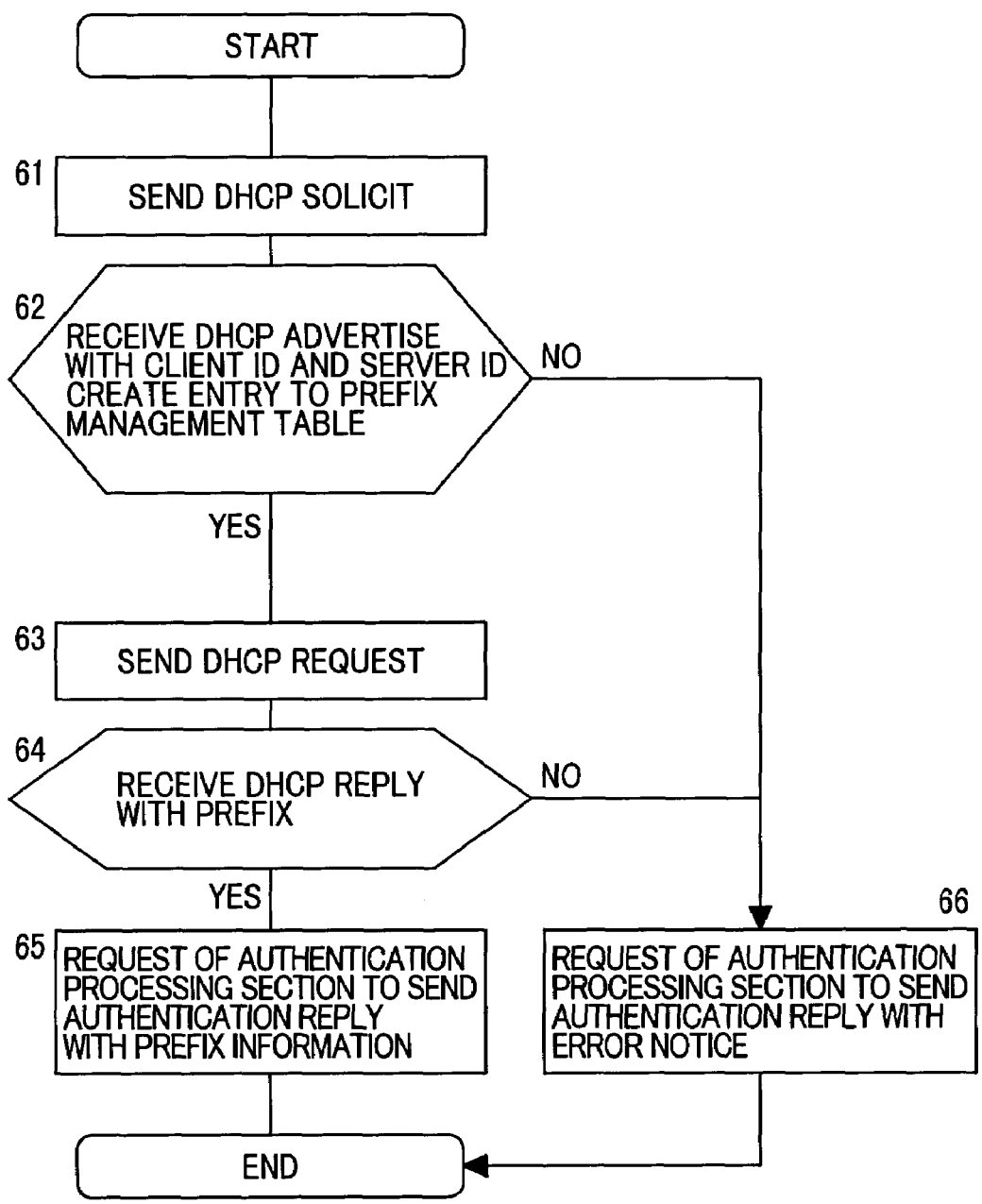
FIG. 11 is a flowchart of the prefix request processing of the gateway equipment (GW) of the first embodiment of the present invention.

The memory 22 contains a DHCP-PD function section 26 and an authentication processing section 27. The DHCP-PD function section 26 has a requesting router function for the DHCP-PD, contains a prefix management table 320 (FIG. 6) and executes a prefix request processing routine 60 (FIG. 11). The authentication processing section 27 contains an acceptable IP address list 340 (FIG. 7) and executes an authentication processing routine 70 (FIG. 10).

FIG. 6 is a drawing showing the structure of the prefix management table 320.

The prefix management table 320 matches the distributed prefix 323, the lifetime (effective period) 324 of the distributed prefix, and the DHCP server identifier 325, with the IAID322 showing the IA_PD321 prefix (group) in the gateway equipment 2 and stores them (323, 324, 325).

FIG. 7 is a drawing showing the table structure of the acceptable IP address list 340.

The acceptable IP address list 340 matches the authenticated IP address 341 and the IP address 342 installed in the authentication processing 27 of gateway equipment 2 and stores them (341 and 342).

The structure of the DNS server is described next. The DNS server 10 is comprised of a CPU, a memory, a storage section for storing a zone file (FIG. 8) and an interface section connected to a network (home network 6).

FIG. 8 is a drawing showing the structure of the zone file 350 contained in the storage (memory) section of the DNS server. The zone file 350 stores the FQDN (Fully Qualified Domain Name) 351, and the IP address 352 corresponding to that domain name. If there request is made to the DNS server for an IP address via the domain name, the DNS server searches the zone file 350 and replies with an IP address matching that domain name. A node that acquired a new IP address can add the new entry by making a request to the DNS server 10.

Figure 9:
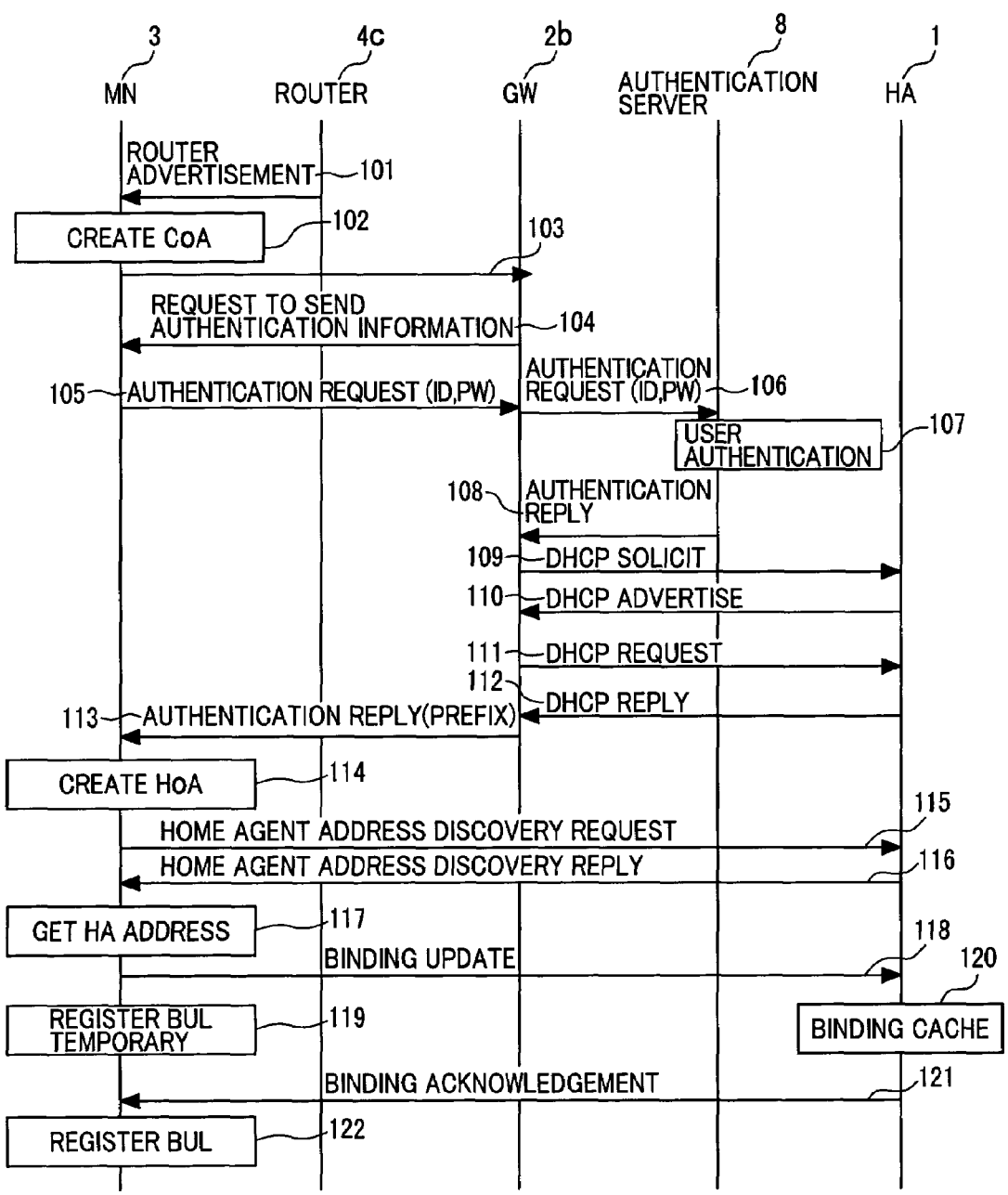
FIG. 9 is a drawing showing the sequence of the binding update processing of the first embodiment of the present invention.

FIG. 9 is a drawing showing the sequence from the MN3 in the visited network 5b creating a home address shown in FIG. 5, to the completion of the binding update processing.

The MN3 receives (101) the router advertisement from router 4c belonging to the network 5b. The MN3 searches the M bit of the router advertisement and sets the method for acquiring the CoA (Care of Address). In other words, if the M bit of the router advertisement is set to 1, then the MN3 acquires the CoA by using the IPv6 statefull address autoconfiguration. If the M bit of the router advertisement is not set, then the MN3 acquires the CoA by using the IPv6 stateless address autoconfiguration (102).

The MN3 sends the CoA acquired in the visited network 5b to the IP packet that was set in the source IP address (103). This IP packet is conveyed via the gateway equipment (GW) 2b. The gateway equipment 2b searches the acceptable address list 340 using the source IP address (CoA). If an entry for that CoA is not present in the acceptable address list 340, then a request to send authentication information to source IP address of the packet (104).

The MN3 that received the authentication information sends an authentication request containing the requested information (ID, password, etc.) to the gateway equipment 2b (105). The gateway equipment 2b performs the authentication processing routine 70 when the authentication request is received (See FIG. 10).

The gateway equipment 2b then sends an authentication request to the authentication server 8 (106). The authentication server 8 authenticates the user (107). If the authentication was a success then a user home network identifier is included in that authentication reply.

The gateway equipment 2 that received the authentication reply 108 executes the prefix request processing routine 60 (See FIG. 11). The gateway equipment 2b creates a prefix and an IA_PD showing the correspondence, from the home network identifier. The gateway equipment 2 sends a DHCP Solicit message addressed to All_DHCP_Relay_Agents_and_Servers address to discover a DHCP server capable of distributing the prefix (109). This solicit message contains a Client Identifier Option for gateway equipment 2b and IA_PD options. The IA_PD options are set in that IAID.

The server section 12 of the HA1 that received the DHCP solicit message (109), starts the Prefix Delegation processing routine 80 (FIG. 12), and sends a DHCP advertise message to the gateway equipment 2b (110).

The gateway equipment 2b receives the DHCP advertise message (110). A check is then made that the IA_PD options and client identifier option of the received message contain correct values and that the server identifier option is included in the received message.

The gateway equipment 2 then sends a DHCP request message containing the IA_PD options to that server section 12 in order to request distribution of an IPv6 prefix (111).

The IPv6 prefix to be distributed is designated when the server section 12 of the HA1 that received the DHCP solicit message is capable of distributing the prefix to the IAID contained in the IAID file of the IA_PD options. When that request message contains IA_PD prefix options in the IA_PD options, the server section 12 searches the IPv6 prefix field and approves the prefix that the gateway 2b wishes to use.

The server section 12 next searches DHCP Client identifier and IAID contained in that DHCP request message and the prefix management table 310 in the IAID. The server section 12 detects the entry created in step 82. The server section 12 then sends a DHCP reply message to the gateway equipment 2b (112).

The gateway equipment 2 checks that the Client Identifier option, IA_PD options and Server Identifier option contain appropriate values when that DHCP reply message is received. The gateway equipment 2 then creates a new entry in the acceptable address list 340, and sends an authentication replay containing prefix information to MN3 (113).

In step 74, when a send authentication request to authentication server message containing an error notice from the prefix request processing routine is received, the gateway equipment 2b sends an authentication reply containing the error notification to MN3 (77) and this routine then ends.

When the MN3 receives an authentication reply containing prefix information, the MN3 creates a home address from the prefix information that was received and from the interface identifier (114).

The MN3 next sends a Home Agent Address Discovery Request for designating the IP address of the HA (115).

Figure 17:
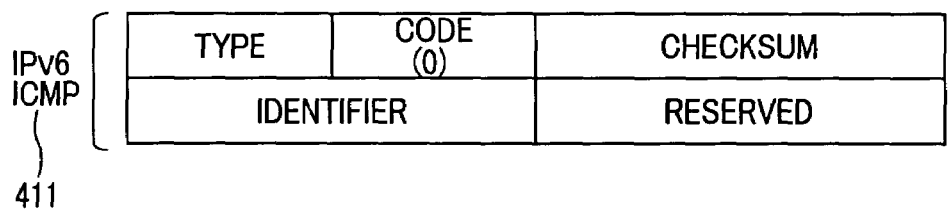
FIG. 17 is a drawing showing the Home Agent Address Discovery Request message format of the first embodiment.

The MN3 sets the CoA acquired in step 102, into the (transmit) source address 41a of the home agent address discovery request message S11 (See FIG. 17). The MN3 sets the prefix received in step 113 as the home network prefix for the Mobile IPv6 Home-Agents Anycast Address, into the destination address 41b of the home agent address discovery request message S11.

Any HA having the same prefix as that Mobile IPv6 Home-Agents Anycast Address, receives the home agent address discovery request.

The server section of HA1 here stores a prefix identical to the prefix of the Mobile IPv6 Home-Agents Anycast Address and receives the Home Agent Address Discovery Request. The server section 11a sends a Home Agent Address Discovery Reply to MN3 (116).

The server section of HA1 stores the following values in the Home Agent Address Discovery Reply message (FIG. 18) to send to the MN3. The HA address (HA list) is stored in the Home Agent Addresses field of IPv6 ICMP411. The source address for the Home Agent Address Discovery Request is set in the destination address 41b. The global unicast address for the server section 11a is set in the (transmit) source address 41a.

The MN3 acquires the HA address from the Home Agent Address Discovery Reply (117). The MN3 first of all, checks whether or not the source address of the Home Agent Address Discovery Reply is in the HA address (HA list). If the source address is contained in the HA list then the MN3 performs a binding update (location registration) for addresses recorded in the HA list. If the source address is not contained in the HA list then the MN3 performs a binding update of the source address.

The HA list for this Home Agent Address Discovery Reply does not contain a source address. The MN3 performs the binding update (location registration) in the server section 11a of HA1.

The MN3 sends the binding update message to the server section 11a of HA1 (118). The MN3 temporarily records the server section 11a address in the binding update list management table (119).

Figure 19:
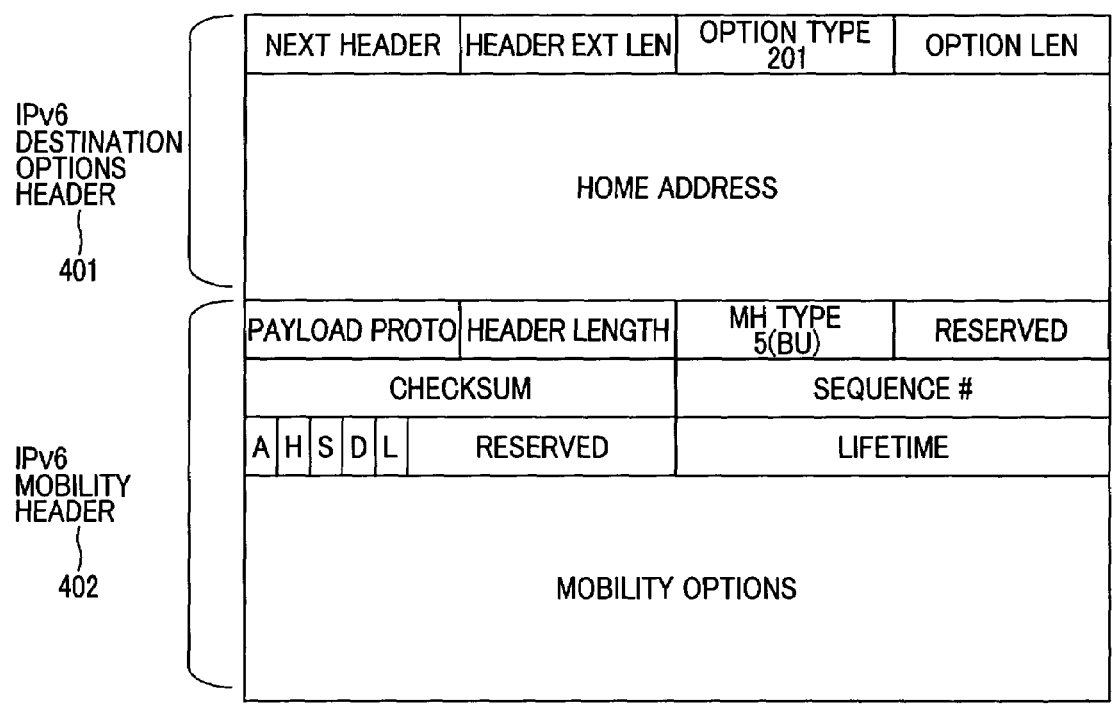
FIG. 19 is a drawing showing the Binding Update message format of the first embodiment.

The following values are stored as shown in FIG. 19 when MN3 sends the binding update to the server section 11a. The CoA of MN3 is set in the source address 41a of the IPv6 header. The home address created by MN3 in step 114 is set in the home address field of the IPv6 Destination Options Header 401.

The server section 11a of HA1 receives the binding update message and extracts the home address contained in the Pv6 Destination Options Header 401. The server section 11a searches the binding cache management table 330 to find if that home address entry is present. If that MN3 entry is not found in the binding cache management table 330, then the MN3 entry is added to the binding cache management table 330 (120). The MN3 sets the CoA acquired in the visited network 5b into the Care of Address 332 of that entry. The server section 11a functions as a proxy for the MN3.

Figure 20:
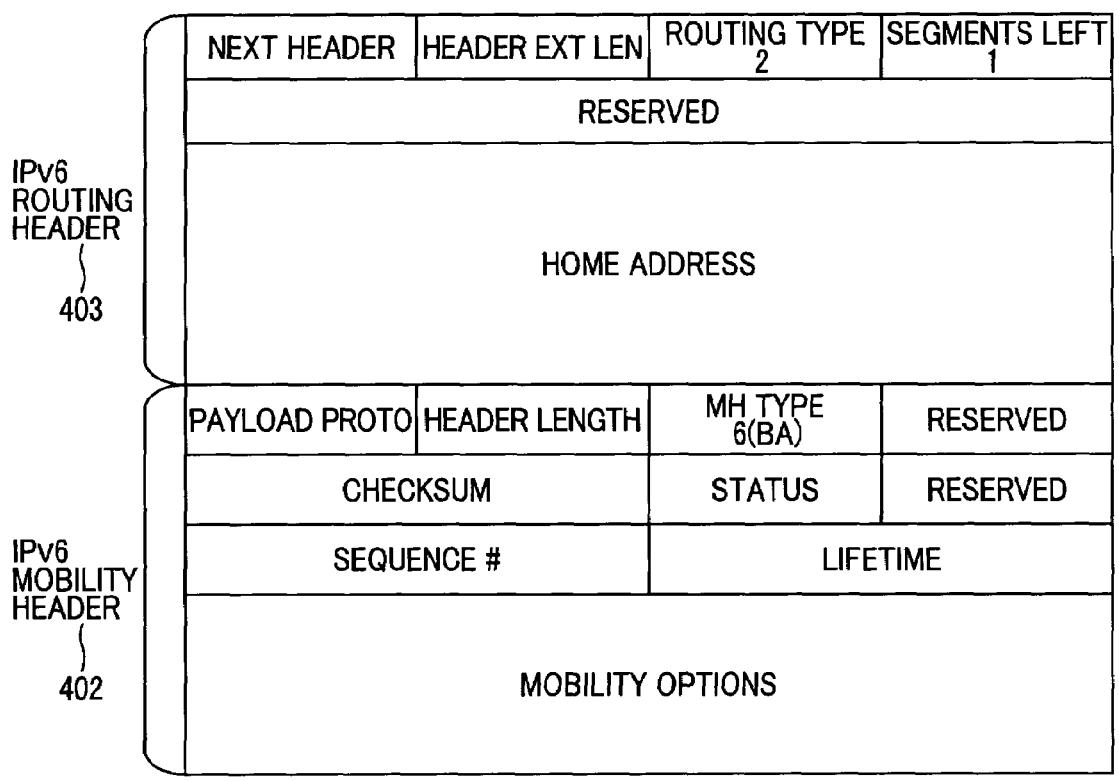
FIG. 20 is a drawing showing the Binding Acknowledgment message format of the first embodiment.

The server section 11a sends a binding acknowledgment to the MN3 (121). The binding acknowledgment that the server section 11a sends to the MN3 is stored as the following values as shown in FIG. 20. The (transmit) source address of the binding update received in step 118 is stored in the destination address 41b of the IPv6 packet header. The MN3 home address is stored in the home address field of the IPv6 routing header 403 when storing the values other than the MN3 home address in the destination address 41b.

When a binding acknowledgment is received showing that the binding update ended correctly, the MN3 registers the entry temporarily stored in step 119, into the binding update list management table (122).

The MN3 may at this point also register the identification information (for example, FQDN) and corresponding information for the home address acquired in step 114, into the location information management device (for example, DNS server) belonging to the home network 6, visited network 5 or the IP network 7.

The processing in the gateway equipment 2b from 106 through 113 in FIG. 9 is described next. FIG. 10 is a flowchart of the authentication processing routine 70. This authentication process is implemented in the authentication processing section 27.

The gateway equipment 2b sends an authentication request to the authentication server 8 (106 in FIGS. 9 and 71). The authentication server 8 sends the authentication results to the gateway equipment 2b (108 in FIG. 9). If authentication was successful, then the home network identifier of the user is included in that authentication reply.

The gateway equipment 2b that received the authentication reply, searches the authentication results and determines if authentication was a success or not (72). If the authentication succeeded, the prefix request processing routine 60 (in FIG. 11) starts up (73). On the other hand, if the authentication in step 72 failed, then the gateway equipment 2b sends an authentication reply containing an error notice to the MN3 (77) and this routine then ends.

When an authentication reply transmit request containing the prefix is received from the prefix request processing routine (74), a new entry is created in the acceptable address list 340 (FIG. 7) and the IP address (CoA of MN3) 341 and effective period 342 are then stored (75). The gateway equipment 2b sends an authentication reply containing prefix information to the MN3 (113 in FIGS. 9, and 76) and this routine then ends.

However, when the gateway equipment 2b receives an authentication response request containing an error notice from the prefix request processing routine in step 74, the gateway equipment 2b sends an authentication response (77) containing an error notification to MN3 and this routine then ends.

The server section 12 may also use the DHCP Reply message (112 in FIG. 9) to notify the gateway equipment 2b with information such as the IP address of the DNS server 10. The gateway equipment 2b sends an authentication response containing information received from the server section 12 (76).

FIG. 11 is a flowchart of the prefix request processing routine 60. This routine is executed on DHCP-PD function section of the gateway equipment 2.

Figure 15:
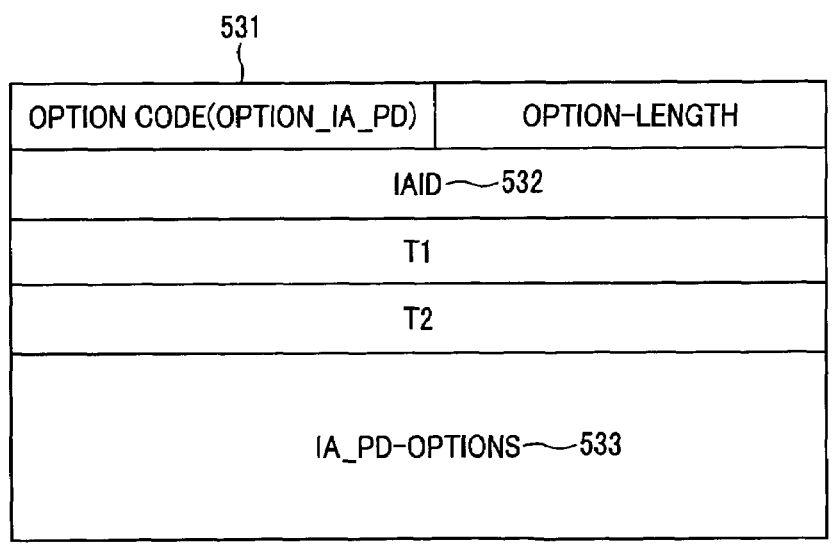
FIG. 15 is a drawing showing the IA_PD options format of the first embodiment of the present invention.

The gateway equipment 2b designates an IA_PD linked with the prefix, from the home network identifier contained in the authentication request send from the authentication server 8. A DHCP Solicit message is sent addressed to All_DHCP_Relay_Agents_and_Servers addressed (109 of FIG. 9, 61). This solicit message contains a client identifier option for the gateway equipment 2 and an IA_PD options (FIG. 15). The IA_PD options (533 of FIG. 15) are set in that IAID.

The authentication processing section 27 of gateway equipment 2b is comprised of a user prefix management table (FIG. 4). This table may hold a user ID received in step 105 and information corresponding to the prefix information sent to MN3 in step 113.

The gateway equipment 2b receives the DHCP Advertise message and checks (110 in FIG. 9) that appropriate values are set in the IA_PD options and Client Identifier option of the received message and contained in the Server Identifier option of the received message. The gateway equipment 2b next searches the prefix management table 320 (FIG. 6) for the IAID contained in the IA_PD options of the DHCP Advertise message. If there is no applicable entry, the gateway equipment 2 creates a new entry in the prefix management table 320 and stores the DHCP Advertise message of the IAID and the identifier of the DHCP server. The gateway equipment 2 also stores home network identifier acquired in step 108 in IA_PD321 (62).

The gateway equipment 2 next sends a DHCP Request message containing IA_PD options to the server section 12 for requesting distribution of the IPv6 prefix (63, 111).

If the Advertise message received in step 110 is contained in the IA_PD Prefix options (FIG. 16), then that Request message contains a prefix in IPv6 prefix field 535 of IA_PD Prefix Options that the gateway equipment 2 wishes to use.

When the DHCP reply message is received, the gateway equipment 2 checks that the Client Identifier option, IA_PD options and Server Identifier option have appropriate values (64). If the values are appropriate, the gateway equipment 2b searches the prefix management table 320 using the IAID and DHCP Server identifier contained in the DHCP replay message. The gateway equipment 2 detects the entry made in step 62, stores the IPv6 Prefix and lifetime of the prefix distributed to the applicable entry and rewrites the entry. After rewriting the applicable entry, the gateway equipment 2b requests (65) sending of an authentication reply containing IPv6 Prefix information from an authentication processing section 27 and this routine then ends.

However, when a DHCP advertisement containing appropriate parameters could not be received in step 62 or a DHCP reply message containing a prefix could not be received in step 64 (including when a DHCP reply message without the applicable entry was received in the prefix management table 320) the gateway equipment 2b requests (66) an authentication reply containing an error notice from the authentication processing section 27, and this process ends.

The HA1 processing from 110 to 112 in FIG. 9 is described next.

FIG. 12 is a flowchart of the prefix delegation processing routine 80. The DHCP-PD function section 16 of HA1 executes this routine.

The server section 12 of HA1 that received the DHCP Solicit message, searches the IA_PD file of IA_PD options for the DHCP Solicit message. The server section 12 then decides whether or not a prefix can be distributed to the received IAID (81).

If the prefix can be distributed, the server section 12 searches the DHCP client identifiers contained in the solicit message and the prefix management table 310 (FIG. 4). If there is no applicable entry, the server section 12 creates a new entry in the prefix management table 310 and stores the DHCP client identifier 311 contained in the solicit message and the IAID 312. The server section 12 then sends the DHCP advertise message to the gateway equipment 2b (110 of FIG. 9).

The advertise message contains an identifier for the server section 12 (Server Identifier option) and identifier for gateway equipment 2b (Client Identifier option) and the IA_PD option received in step 109. The server section 12 may also include IPv6 prefix information distributable to IAID, in the DHCP Advertise message. The IPv6 prefix information is set in IPv6 prefix field 535 of the IA_PD options contained in the IA_PD options 533 of the advertise message. The server section 12 designates a distributable IPv6 prefix using IAID.

When the server section 12 then receives the DHCP request message (111 of FIG. 9), it searches the IAID file of IA_PD options. If the prefix can be distributed to IAID, then the server section 12 designates a distributable IPv6 prefix. When the request message contains IA_PD prefix options in the IA_PD options, the server section 12 searches the IPv6 prefix field and approves the prefix that the gateway equipment 2b wishes to use.

The server section 12 searches the DHCP client identifiers contained in the request message and the prefix management table 310 with IAID. The server section 12 detects the entry created in step 82 and stores the prefix Lifetime and IPv6 prefix distributable to the applicable entry. The server section 12 sends the DHCP reply message to the gateway equipment 2b (112 in FIG. 9) and this routine then ends. The reply message contains the IPv6 prefix information stored in the prefix management table 310 in the IA_PD Prefix options field of IA_PD options 533.

If the server section 12 cannot distribute the IPv6 Prefix to the IAID in step 81, then the server section 12 sends an advertise message containing a status code option showing the prefix cannot be distributed to the gateway equipment 2b, and this routine then ends (85).

When a prefix for distribution cannot be designated in step 83 or when there is no applicable entry in the prefix management table 310 in step 84, then the server section 12 sends a reply message containing error notice to the gateway equipment 2b (86) and this routine then ends).

Figure 13:
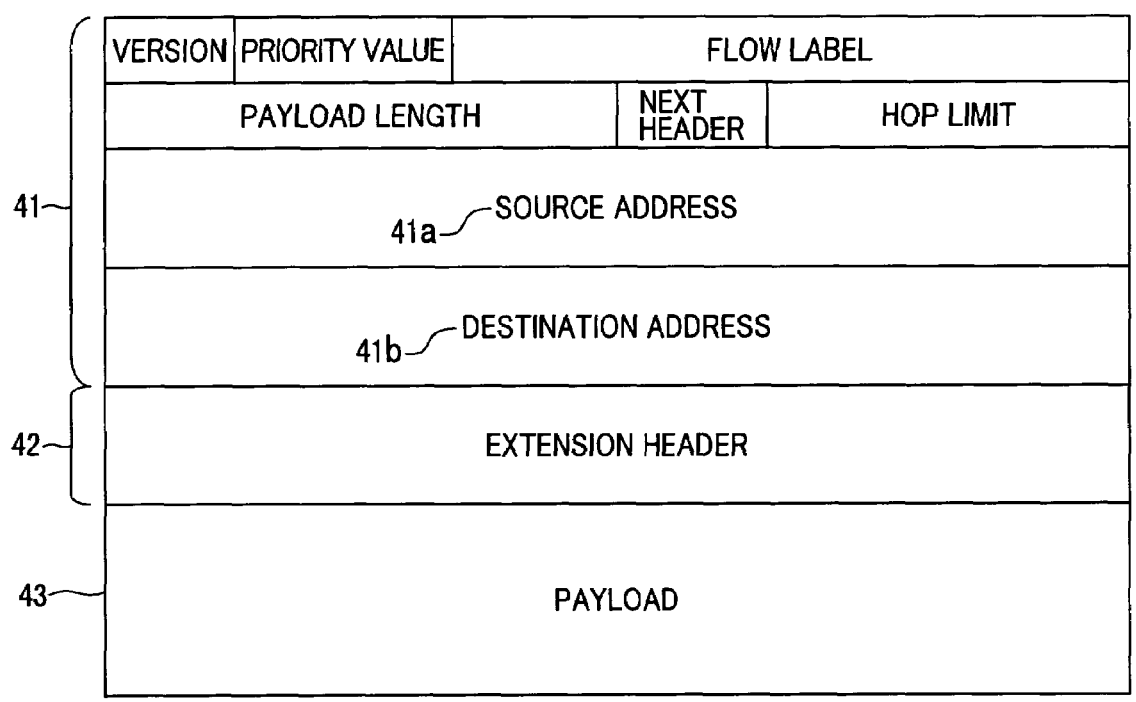
FIG. 13 is a drawing showing the format of the IPv6 packet of the first embodiment of the present invention.

FIG. 13 is a drawing showing the format of the IPv6 packet.

The source address 41a and the destination address 41b are contained in the IPv6 header 41. Information such as IPv6 path information can be stored in the extension header 42, and in this embodiment it can store the IPv6 destination options header 401 (FIG. 19), IPv6 mobility header 402 (FIG. 19, FIG. 20) and the IPv6 routing header 403 (FIG. 20). The DHCP message S1 (FIG. 14) can be stored in the payload 43 which can include TCP/UDP Header 43A and Data 43B as per FIG. 14.

Figure 14:
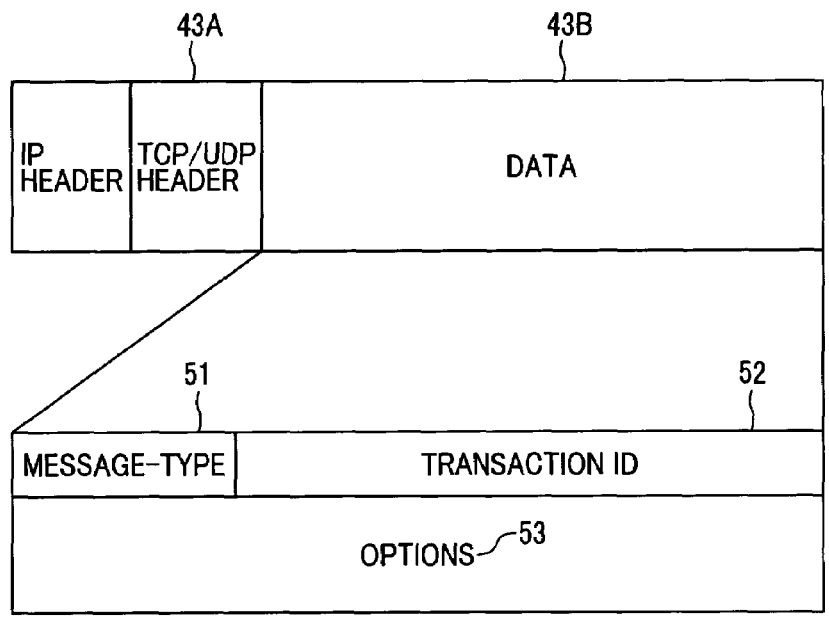
FIG. 14 is a drawing showing the format of the DHCPv6 packet of the first embodiment of the present invention.

FIG. 14 is a drawing showing the format containing the DHCPv6 message S1.

In the packet with DCHPv6 message, the DHCPv6 is an application protocol using UDP/IP in the transport layer. The DHCP message is specified by a value in the message type field 51. The DHCP message option parameter is set in the options field 53.

FIG. 15 is a drawing showing the format of IA_PD options S2.

The option code field 531 shows the type of DHCP message option parameter. The IAID is set in the IAID field 532. The IA_PD Prefix options are included in the IA_PD options 533.

Figure 16:
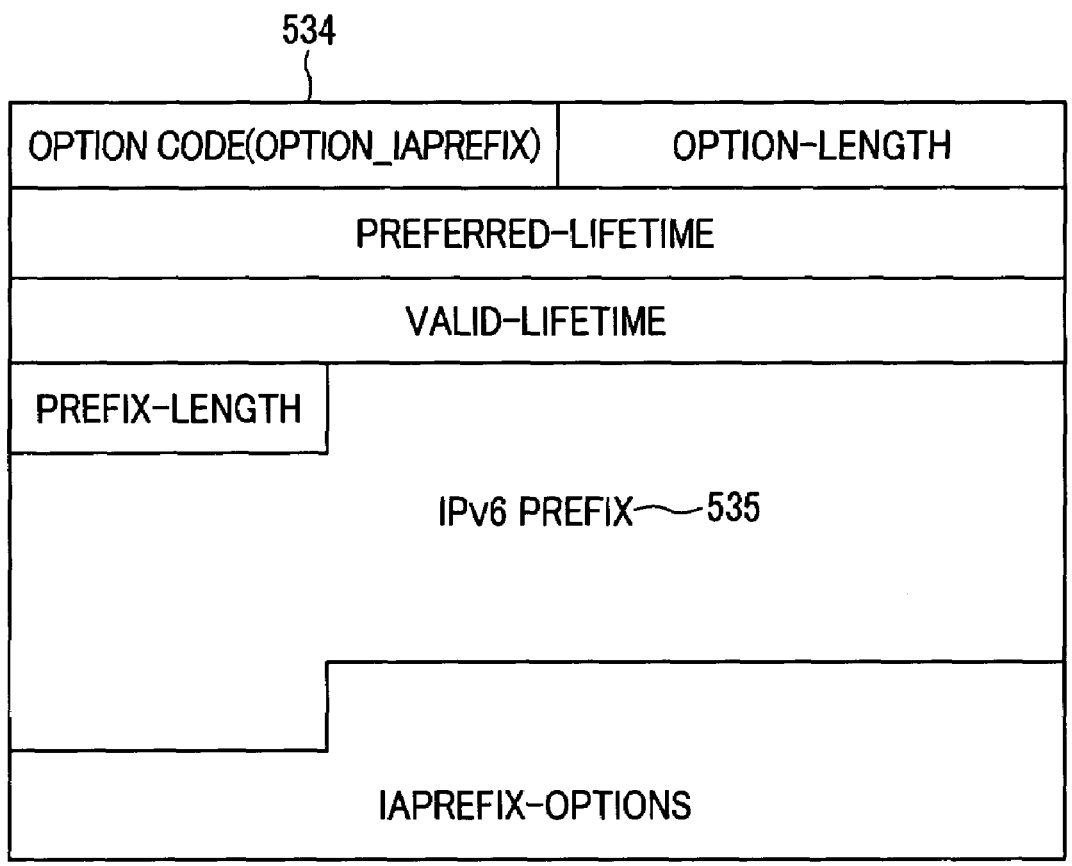
FIG. 16 is a drawing showing the IA_PD prefix options format of the first embodiment of the present invention.

FIG. 16 is a drawing showing format of the IA_PD prefix options S3.

The IPv6 prefix field 535 contains prefix information capable of being distributed to the IAID.

FIG. 17 is a drawing showing the format of the Home Agent Address Discovery Request message S11.

The Home Agent Address Discovery Request message S11 is stored in the payload 43 of the IPv6 packet.

Figure 18:
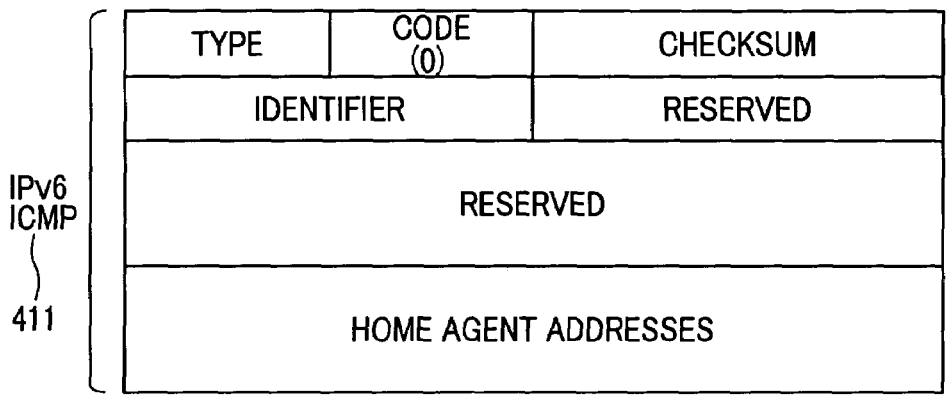
FIG. 18 is a drawing showing the Home Agent Address Discovery Reply message format of the first embodiment.

FIG. 18 is a drawing showing the format of the Home Agent Address Discovery Reply message S12. The Home Agent Address Discovery Reply message S12 is stored in the payload 43 of the IPv6 packet.

FIG. 19 is a drawing showing the format of the Binding Update message S13. The IPv6 Destination Options Header 401 and IPv6 Mobility Header 402 are stored in the extension header 42 of the IPv6 packet.

FIG. 20 is a drawing showing the format of the Binding Acknowledgment message S14. The IPv6 Routing Header 403 and the IPv6 Mobility Header 402 are stored in the IPv6 packet extension header 42.

In the first embodiment of the present invention as described above, the HA1 and the gateway equipment contain a DHCP-PD function. The gateway device 2 starts this DHCP-PD function when the authentication request is received. The HA1 in other words, contains a means for distributing a prefix to the gateway equipment 2 belonging to visited network 5. Since this gateway equipment 2 belonging to visited network 5 contains a means to notify MN3 of the prefix, the gateway equipment 2 can therefore notify MN3 of the prefix information distributed from HA1 so that MN3 outside the home network can acquire the home address.

Since the MN3 contains a means to register identification information (for example, FQDN) and (mapping) information linked to the home address acquired in the visited network 5, in the DNS server, a call destination service can also be provided in the visited network 5 for MN3 that acquired a home address.

The second embodiment of the present invention is described next. In addition to the first embodiment, the second embodiment is characterized in that the HA1 and gateway device 2 receive programs from a network management equipment 31.

Figure 21:
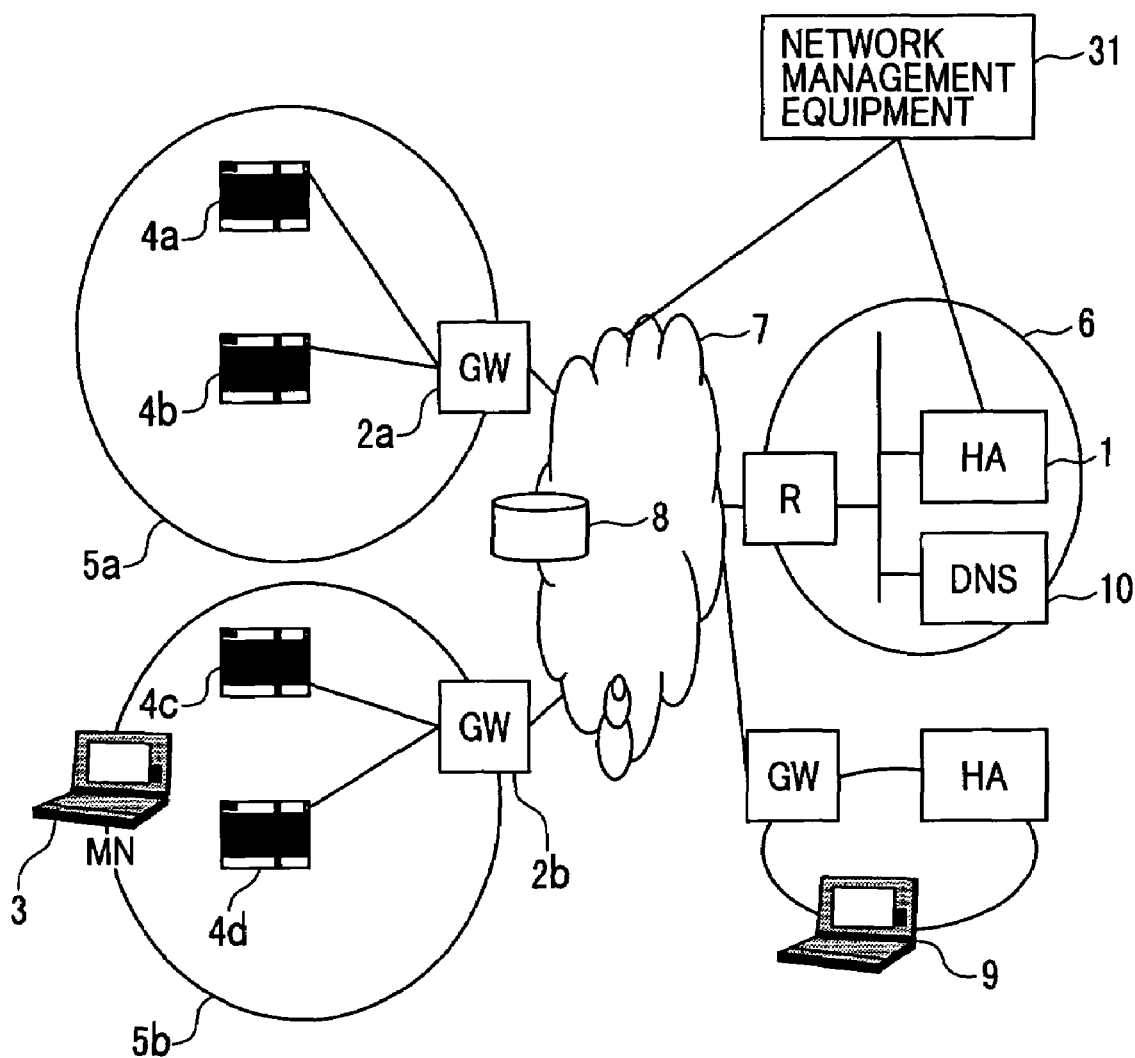
FIG. 21 is a diagram showing the structure of the communication network of the second embodiment of the present invention.

FIG. 21 is a diagram showing the structure of the communication network of the second embodiment.

The second embodiment has a network management equipment 31 in addition to the structure (FIG. 1) of the previously described first embodiment. This network management equipment 31 is connected to the HA1 and the gateway equipment 2. The network management equipment 31 contains a means to send programs to the HA1 and the gateway equipment 2. The structure is the same as previously described for the first embodiment (FIG. 1) so identical reference numerals are assigned and a detailed description of those sections is omitted.

Figure 22:
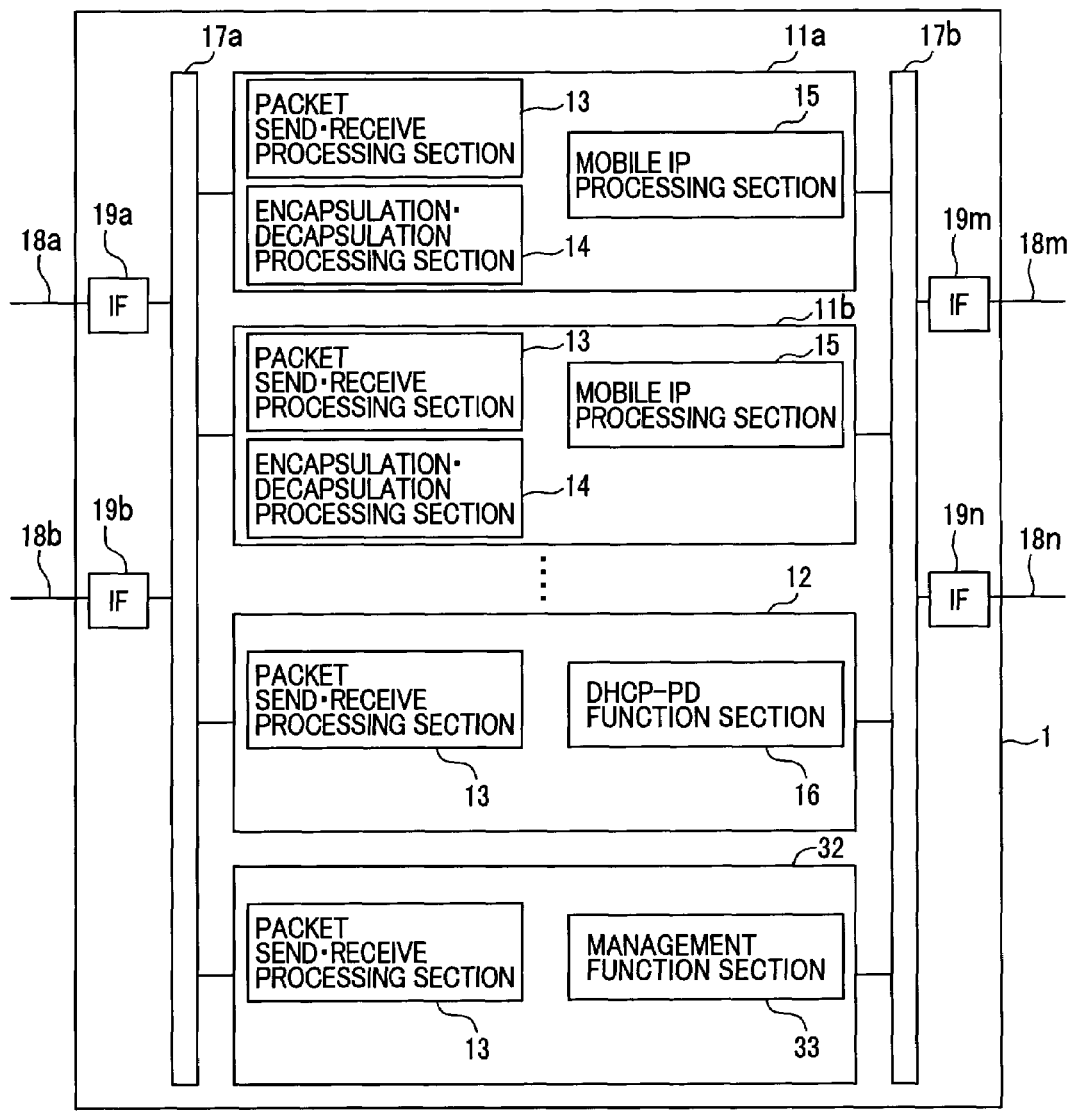
FIG. 22 is a block diagram of the home agent (HA) of the second embodiment of the present invention.

FIG. 22 is a block diagram of the structure of the home agent (HA) 1 of the second embodiment.

In addition to the structure (FIG. 2) of the first embodiment, the HA1 contains a server section 32 having a management function section 33. In the present embodiment, the program and data used for the authentication operation are received from the network management equipment 31. Sections having the same structure as the first embodiment (FIG. 2) are assigned the same reference numerals and their detailed description is omitted here.

Figure 23:
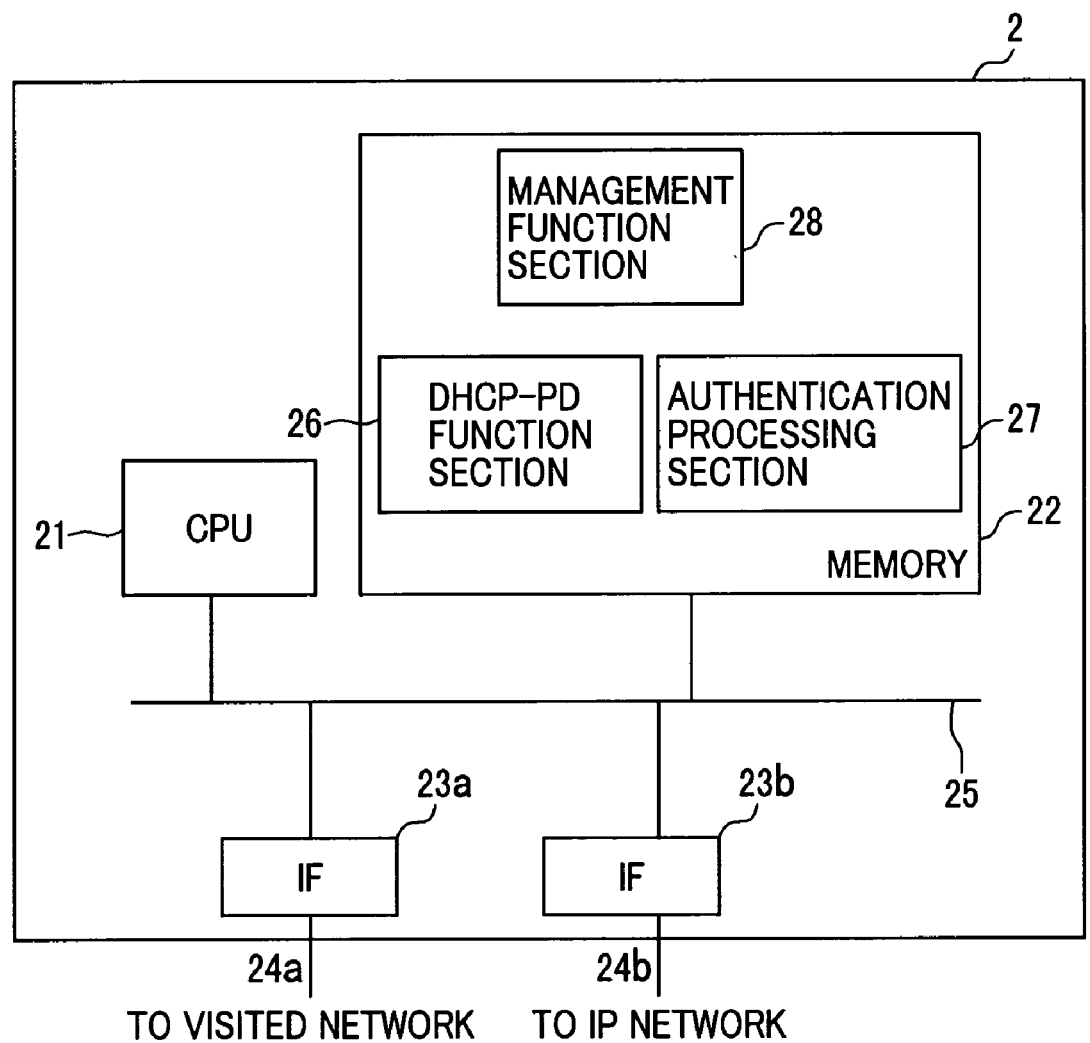
FIG. 23 is a block diagram of the gateway equipment (GW) of the second embodiment of the present invention.

FIG. 23 is a block diagram of the gateway equipment (GW) 2 of the second embodiment of the present invention.

In addition to the structure (FIG. 5) of the first embodiment, the gateway device 2 contains a management function section 28 in a memory 22.

The HA1 and the gateway equipment 2 receive from the network management equipment 31, the respective programs and information needed for the prefix distribution shown in the first embodiment. The HA1 installs the received programs and information into the DHCP-PD function of the server section 12, and runs the applicable program with the DHCP-PD function section 16. The gateway device 2 installs the received programs and information into the DHCP-PD function 26 of the memory 22 and the authentication processing section 27, and runs the applicable program with the DHCP-PD function section 26 and the authentication processing section 27. Sections identical in structure to the first embodiment (FIG. 5) are assigned the same reference numerals and their detailed description is omitted here.

The second embodiment of the present invention as described above is comprised of a network management equipment 31 to provide the HA1 and the gateway equipment 2 with programs and data needed for notifying the MN3 of the prefix. Providing the HA1 and gateway equipment 2 with a function to receive the applicable programs and data from the network management equipment 31 allows functions to be automatically installed and the authentication operation executed without having to install these functions beforehand as was described for the first embodiment, and the functions of the mobile communication network (of the second embodiment) can easily be improved.

The third embodiment of the present invention is described next. The third embodiment is characterized in that the gateway equipment 2 contains a MAP function for HMIPv6.

Figure 24:
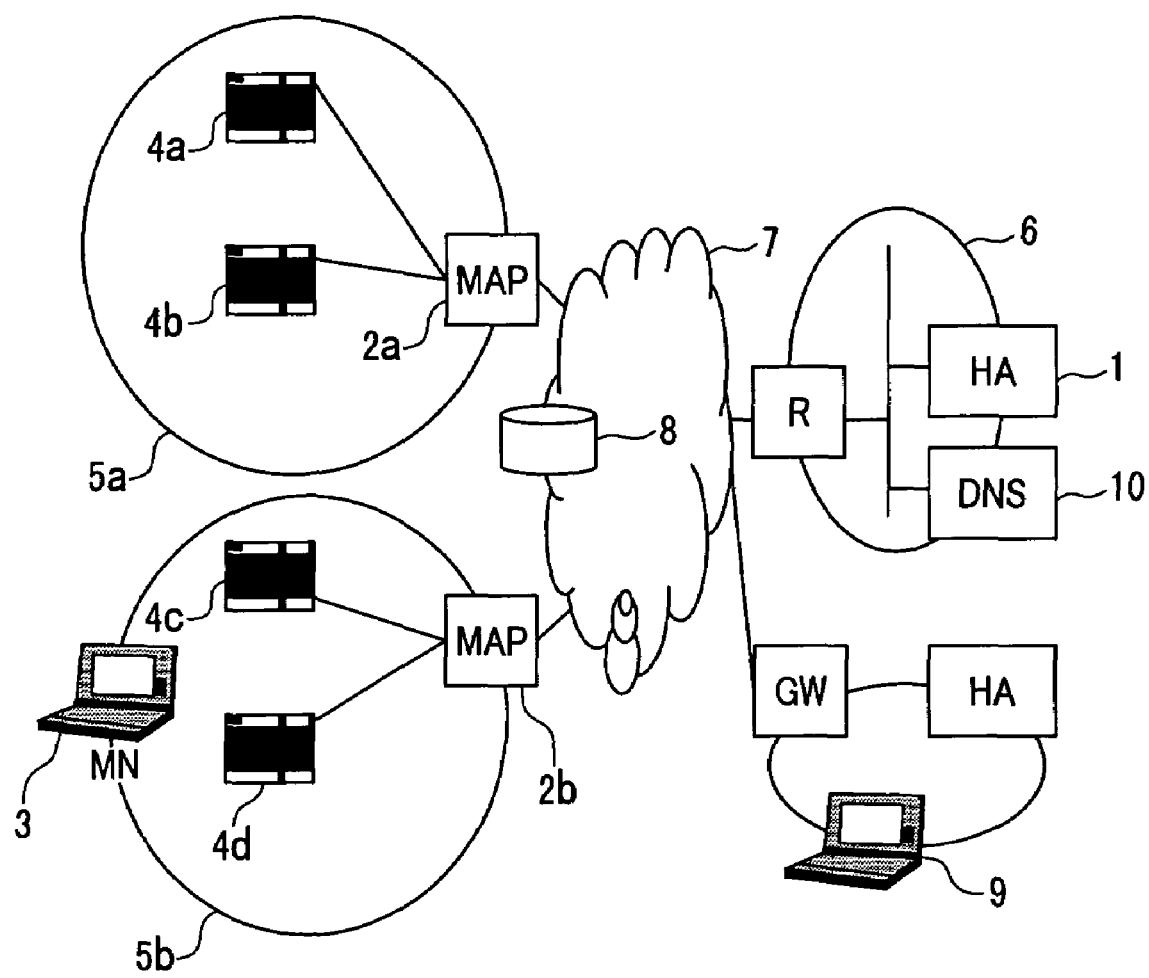
FIG. 24 is an illustrative drawing showing the structure of the communication network of the third embodiment of the present invention

FIG. 24 is a diagram showing the structure of the communication network of the third embodiment.

The third embodiment differs from the above described structure (FIG. 1) of the first embodiment in that MN3 is a HMIPv6 mobile terminal and that the gateway equipment (MAP) 2 comprises a MAP function for HMIPv6. Sections identical in structure to the first embodiment (FIG. 1) are assigned the same reference numerals and their detailed description is omitted here.

Figure 25:
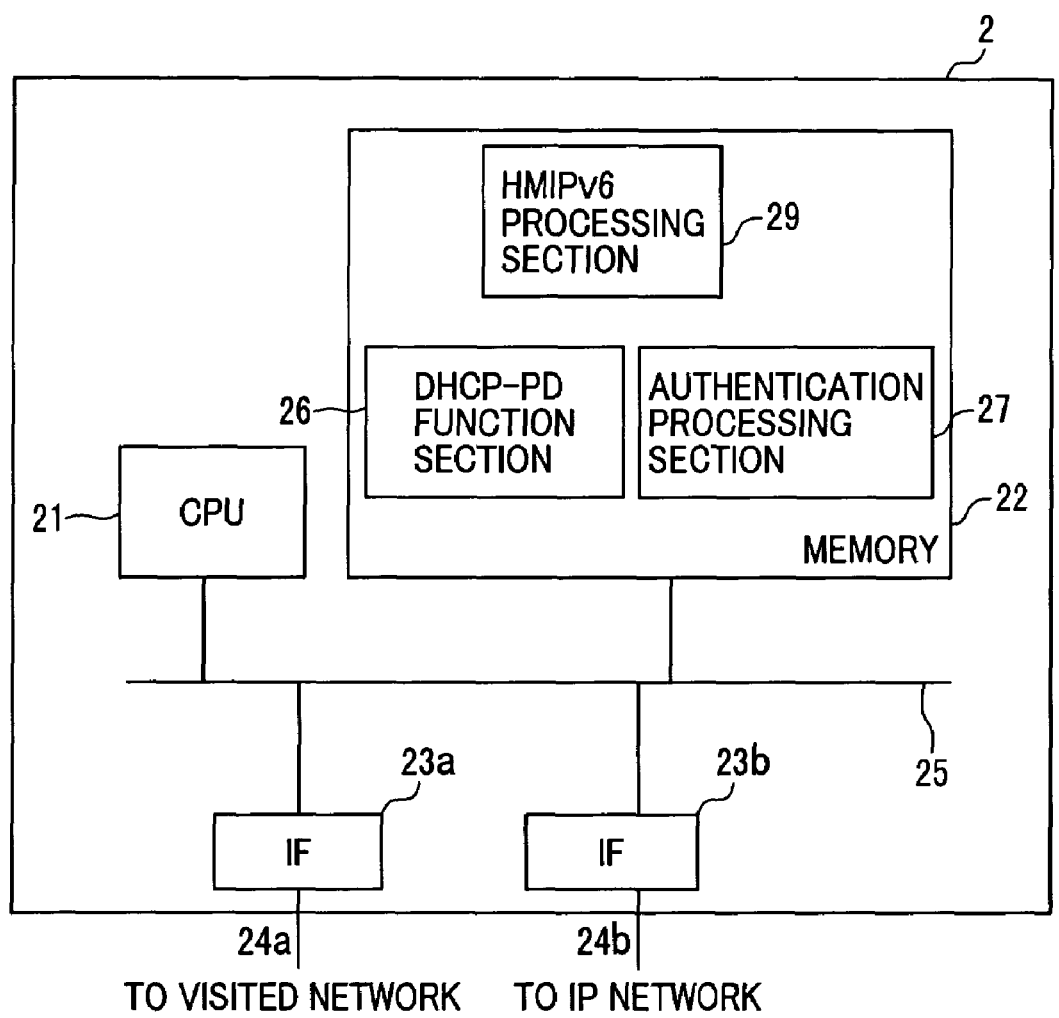
FIG. 25 is a block diagram of the gateway equipment (MAP) of the third embodiment of the present invention.

FIG. 25 is a block diagram showing the gateway equipment (MAP) 2 of the third embodiment.

In addition to the structure (FIG. 5) of the first embodiment, the gateway device 2 contains an HMIPv6 processing section 29 in the memory 22. This HMIPv6 processing section 29 provides a MAP function and contains a binding cache management table for holding information linked to the RCoA and LCoA. Sections identical in structure to the first embodiment (FIG. 5) are assigned the same reference numerals and their detailed description is omitted here.

Figure 26:
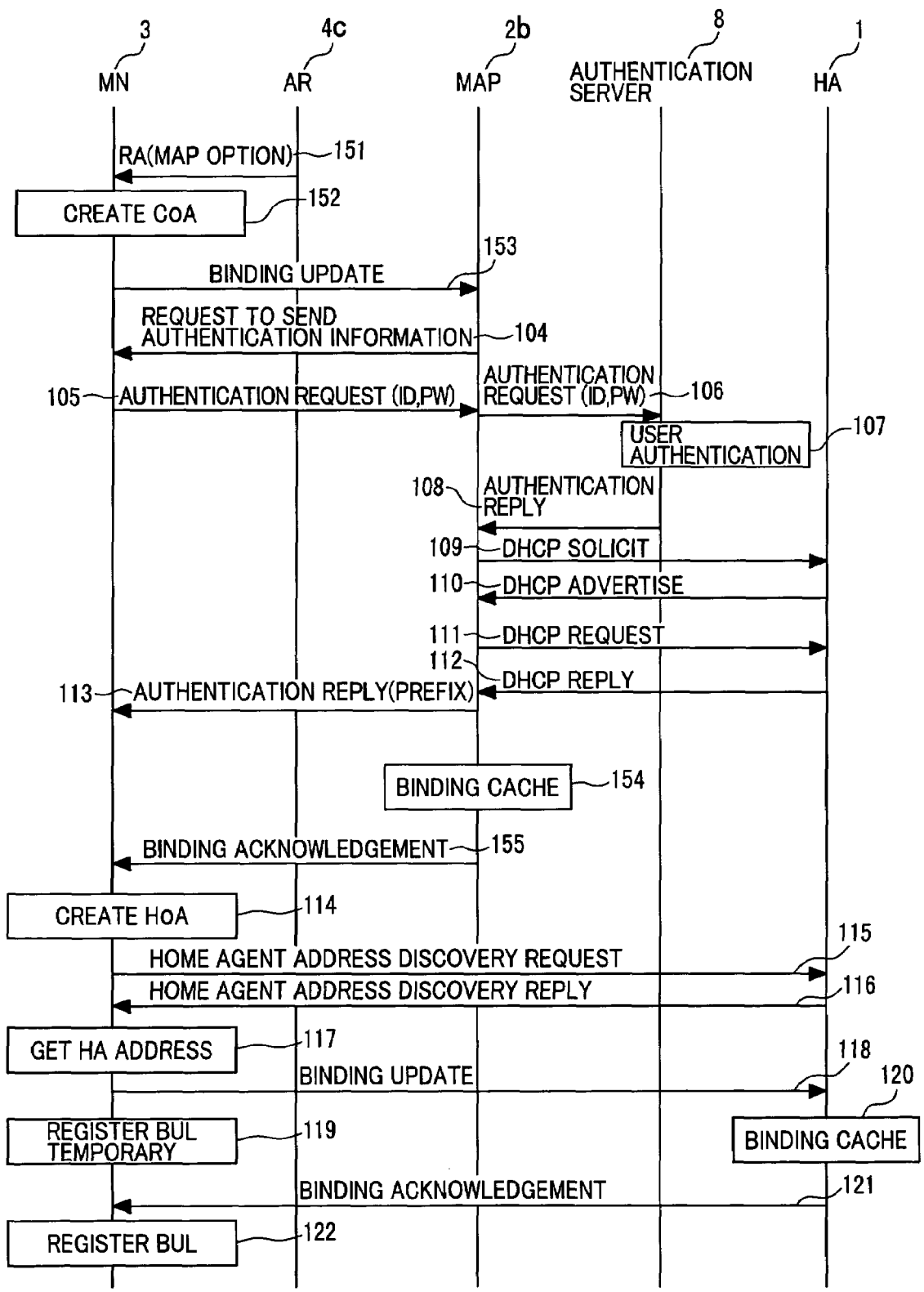
FIG. 26 is a sequence diagram of the binding update processing routine of the third embodiment of the present invention.

FIG. 26 is a sequence diagram of the processing routine from the MN3 in the visited network 5*b* shown in FIG. 24 creating a home address, to the completion of the binding update (location registration) in the MAP2*b*.

The MN3 receives a router advertisement containing a MAP option from the router (AR: Access Router) 4*c* belonging to the network 5*b* (151). When the router advertisement containing the MAP option is received, the MN3 specifies the gateway equipment (MAP) 2*b* containing the HMIPv6 processing section 29, from the information contained in the MAP option. The MN3 next creates the RCoA and LCoA by using the information contained in the router advertisement MAP option (152).

The MN3 sends the binding update (location registration) signal showing the location registration to the MAP in the MAP 2*b* (153). The following information is stored in the binding update (location registration) signal. The LCoA created in step 152 by the MN3 is set in the source address 141*a*. The MAP2*b* address is set in the destination address 41*b*. The RCoA created by the MN3 in step 152 is set in the home address option of the Destination Options Header 401.

The MAP2*b* that received the binding update (location registration) signal then starts the authentication processing. This MAP2*b* that received the binding update (location registration) signal, searches the acceptable IP address list 340 in the source IP address (LCoA). If there is no LCoA entry for the MN3 in the acceptable IP address list 340, then a request to send authorization information is sent (104) to the packet source (NN3). The processing from here onwards from step 104 to step 113 is the same as in the first embodiment (FIG. 9).

In the third embodiment, the MAP 2*b* adds an LCoA and RCoA for the MN3 to the acceptable IP address list 340 (FIG. 7).

If the authentication processing ends normally, then the binding information for the RCoA and LCoA of the MN3 is stored in the binding cache management table of HMIPv6 processing section 29 (154). The MAP2*b* then sends the binding acknowledgment to the MN3 (155). A MAP 2*b* address is next set in the source address 41*a* of this binding acknowledgment. An LCoA for MN3 is set in the destination address 41*b*, and an RCoA for MN3 is set in the routing header 403.

However, if the authentication processing does not end normally, then the MAP2*b* sends a binding acknowledgment containing an error notification to the MN3 (155).

If a binding acknowledgment (155) was received showing that the binding update (location registration) ended normally, then a home address is created from the prefix information received in step 113 and the MN3 interface identifier (114). The processing from here onwards from step 114 to step 122 is the same as in the first embodiment (FIG. 9).

The MN3 registers the home address created in step 114 and the RCoA binding information created in step 152, into the HA1. The source address 41*a* of the binding update 118 is set based on the MAP option contained in the router advertisement received by the MN3 in step 151. If the binding update 118 source address 41*a* is not the RCoA, then the RCoA is set in the Alternate-CoA option of binding update 118.

In the third embodiment of the present invention as described above, the HA1 and the gateway equipment contain a DHCP-PD function. The gateway equipment 2 contains an HMIPv6 MAP function. The gateway equipment 2 starts the MN authentication processing when an HMIPv6 binding update (location registration) signal is received, sends a prefix distribution request to the HA, and requests the sending of authentication information. The gateway equipment 2 can therefore start up the DHCP-PD function when the authentication request signal is received, and can notify the MN3 of the prefix information distributed from HA1. Those MN3 located outside of the home network can therefore acquire the home address.

The gateway equipment 2 comprising the HMIPv6 function only permits binding update (location registration) of MN3 whose authentication processing ended normally so a highly safe communication service can be provided.

The fourth embodiment of the present invention is described next. The fourth embodiment is characterized in that the MN3 acquires home network prefix information in the binding update (location registration) response message from the gateway equipment 2. In other words, the DHCP-PD function section 26 of the gateway equipment 2 executes the prefix request processing routine 90 (FIG. 28) instead of the prefix request processing routine 60 (FIG. 11).

Figure 27:
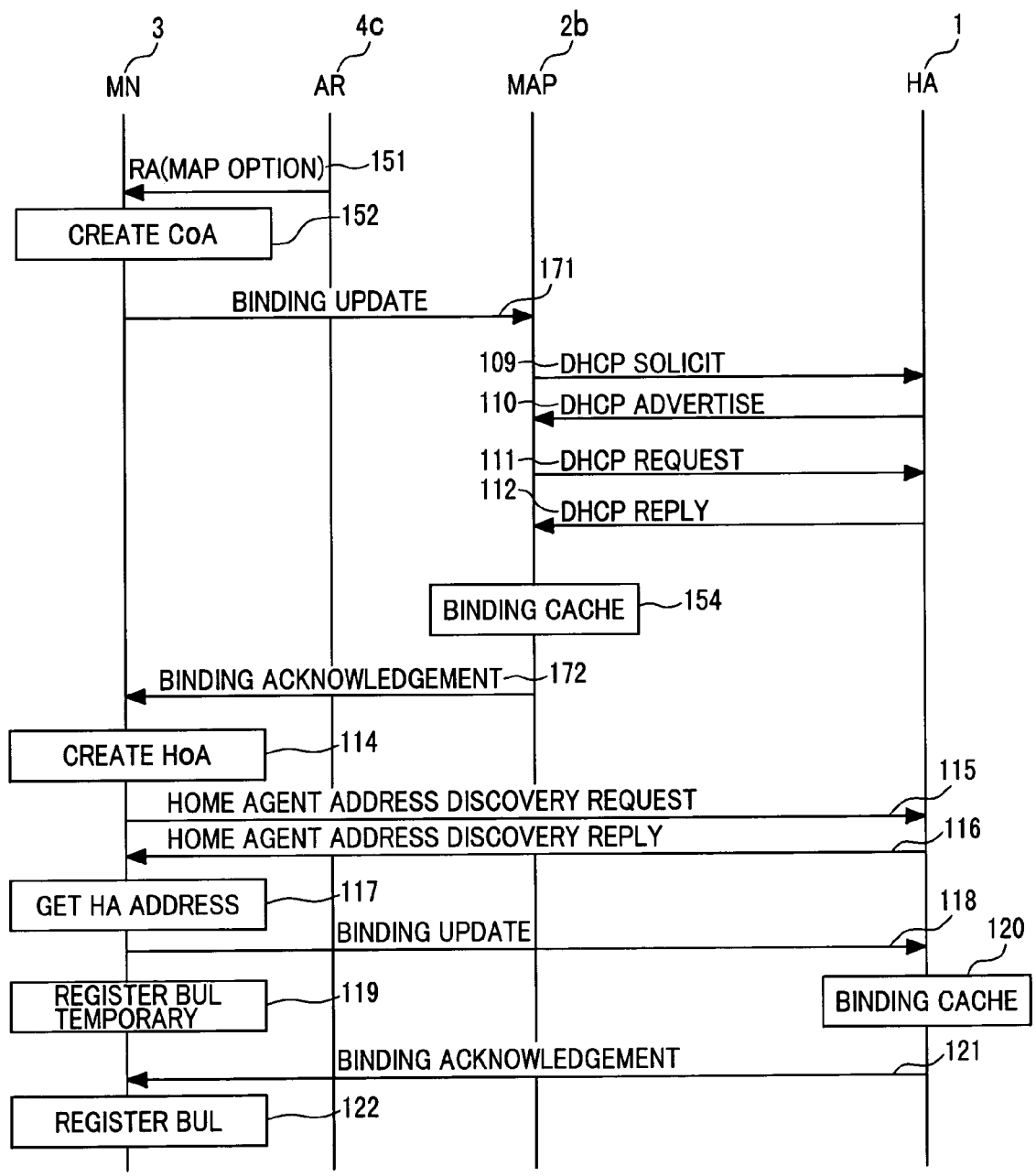
FIG. 27 is a sequence diagram of the binding update processing routine of the fourth embodiment of the present invention.

FIG. 27 is a sequence diagram of the processing routine from the MN3 in the visited network 5*b* shown in FIG. 24 creating a home address, to the completion of the binding update (location registration) in the MAP2*b*.

The processing from step 151 to step 152 are identical to the same steps in the previously described third embodiment (FIG. 26).

When the RCoA and LCoA are created, the MN3 sends a binding update (location registration) signal to the gateway equipment (MAP) 2*b* to show location registration in the MAP 2*b* (171). The binding update (171) is implemented so that the home network identifier of MN3 is contained in the Mobility Options of the Mobility Header 402.

Figure 28:
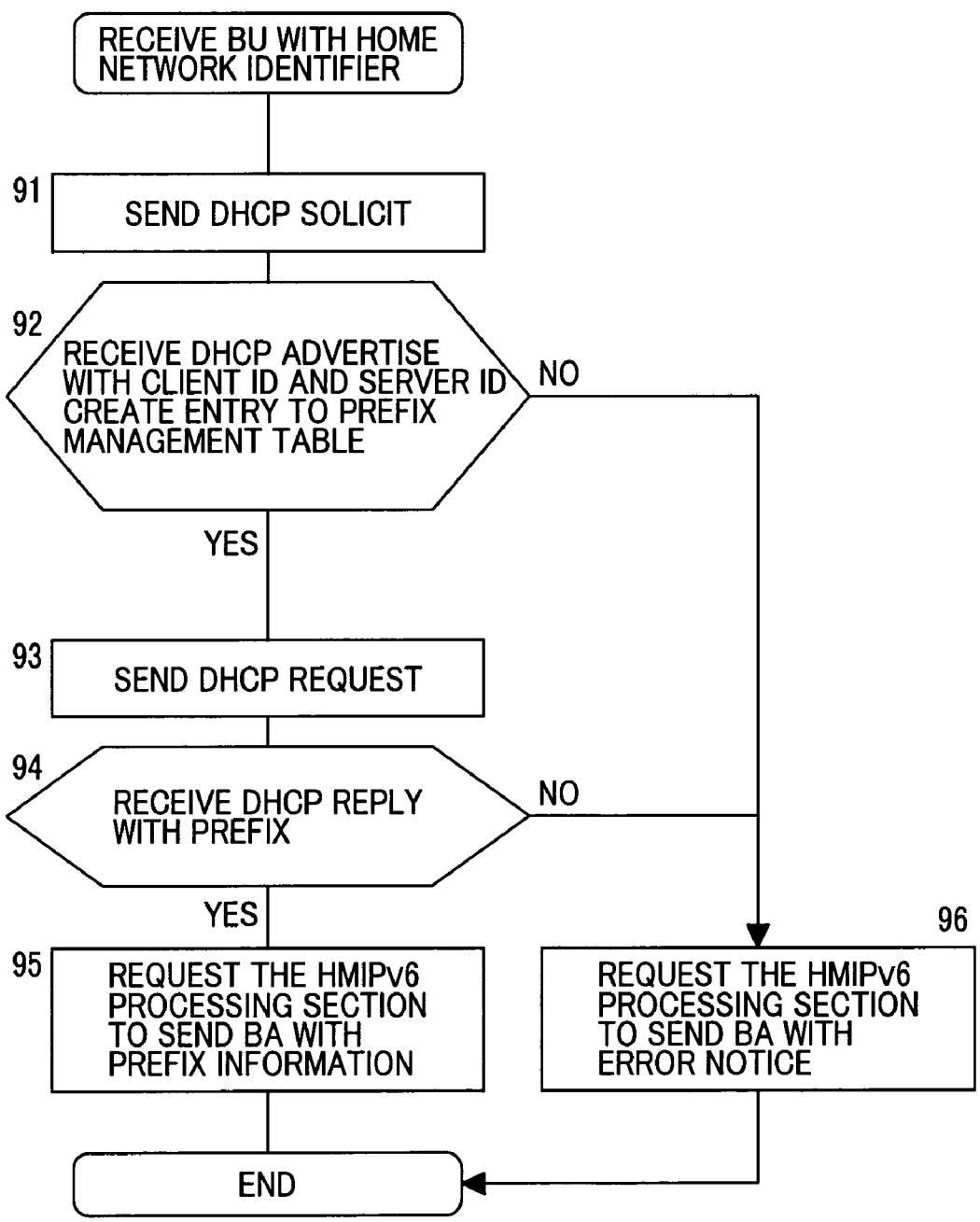
FIG. 28 is a flowchart of the prefix request processing for the MAP of the fourth embodiment of the present invention.

The MAP2 that received the binding update, starts the prefix request processing routine 90 (FIG. 28).

FIG. 28 is a flowchart of the prefix request processing routine 90 of the fourth embodiment.

The MAP 2*b* specifies an IA_PD showing a link to the prefix, from the home network identifier contained in the binding update 171, and creates the IAID. The MAP 2*b* sends a DHCP solicit message addressed to All_DHCP_Relay_Agents_and_Servers in order to discover a DHCP server capable of prefix distribution (91, 109). Hereafter, step 92 through step 94 (from step 110 to step 112 in FIG. 27) are performed by the same processing as in prefix request processing routine 60 of the first embodiment (from step 62 to step 64).

When a DHCP reply message (112) containing the prefix is received, and the MAP2*b* rewrites the applicable entry in the prefix management table 320, it requests a binding acknowledgment containing IPv6 prefix information from the HMIPv6 processing section 29 (95), and this routine then ends (95). After the MAP2*b* stores the MN3 location information in the binding cache management table (154), it sends a binding acknowledgment (172) to the MN3. The binding acknowledgment (172) is implemented so that the IPv6 prefix information is contained in Mobility Options of the Mobility Header 402.

On the other hand, when the processing in step 92 or step 94 did not end correctly, or in other words, when a DHCP advertise message containing the correct parameters could not be received in step 92, or when a DHCP replay message containing a prefix could not be received in step 94 (including the case where a DHCP reply message was received not having an applicable entry in the prefix management table 320); then the MAP2*b* sends a request (96) for sending of a binding acknowledgment containing an error notice to the HMIPv6 processing section 29 (96) and this routine then ends.

The processing from step 114 to step 122 are identical to the same steps in the previously described third embodiment.

In the fourth embodiment of the present invention as described above, the MAP2 starts the DHCP-PD function when the binding update (location registration) signal is received, and the home network prefix of the MN3 can be acquired from the HA1.

What is claimed is:

1. A communication system comprising:
   a home network installed with a home agent for holding mobile terminal location information of a mobile terminal, the mobile terminal using a first home address in the home network;
   a visited network installed with a radio communications device for communicating with a mobile terminal; and
   gateway equipment in said visited network for forming an interface with said home network, wherein said radio communication device contains an access request transfer means for forwarding access requests from said mobile terminal having moved to the visited network to said gateway equipment,
   wherein said gateway equipment comprises:
   a prefix request means for requesting a prefix for said mobile terminal having moved to the visited network from said home agent in response to an access request from said mobile terminal having moved to the visited network, and
   a prefix transfer means for receiving the requested prefix from said home agent and forwarding the received prefix to said mobile terminal having moved to the visited network, and
   wherein the prefix is used, by said mobile terminal, to generate a second home address of said mobile terminal having moved to the visited network,
   wherein along with making a prefix acquisition request, said prefix request means also requests acquisition of Domain Name Server (DNS) server information from said home agent, and
   wherein said prefix transfer means forwards the acquired DNS server information along with said prefix to said mobile terminal having moved to the visited network.

2. A communication system according to claim 1, further comprising:
   decision means for deciding whether or not authentication processing of said mobile terminal having moved to the visited network is required, utilizing a source address of the access request from said mobile terminal having moved to the visited network; and
   authentication means for starting authentication processing of said mobile terminal having moved to the visited network when said decision means decides that authentication processing is required,
   wherein said prefix request means makes a request to said home agent for acquisition of said mobile terminal prefix after said authentication is successful.

3. A communication system according to claim 2, wherein said gateway equipment further comprises:
   location information holding means for holding location information on said mobile terminal having moved to the visited network,
   wherein said authentication means starts said authentication processing after said location information holding means has received a location registration request from said mobile terminal having moved to the visited network.

4. A communication system according to claim 3, wherein said location information holding means holds location information on said mobile terminal having moved to the visited network after said authentication processing was successful.

5. A communication system according to claim 1, further comprising:
   network management equipment connected to said home network and said visited network, wherein said home agent and said gateway equipment comprise acquisition means for acquiring, from said network management equipment, programs and data required for distributing prefixes and authenticating said mobile terminal.

6. A communication system comprising:
   a home network installed with a home agent for holding mobile terminal location information of a mobile terminal, the mobile terminal using a first home address in the home network,
   a visited network installed with a radio communications device for communicating with a mobile terminal; and
   gateway equipment in said visited network for forming an interface with said home network, wherein said radio communication device contains an access request transfer means for forwarding access requests from said mobile terminal having moved to the visited network to said gateway equipment,
   wherein said gateway equipment comprises:
   a prefix request means for requesting a prefix for said mobile terminal having moved to the visited network from said home agent in response to an access request from said mobile terminal having moved to the visited network, and
   a prefix transfer means for receiving the requested prefix from said home agent and forwarding the received prefix to said mobile terminal having moved to the visited network,
   wherein said mobile terminal comprises:
   home address creation means for acquiring said prefix from said prefix transfer means of said gateway equipment and creating, by said mobile terminal, based on said prefix, a second home address, and
   binding information registration means for registering information corresponding to said second home address created from said prefix and identification information of said mobile terminal having moved to the visited network at a Domain Name Server (DNS) server in the visited network, relay network or in a home network;
   wherein along with making a prefix acquisition request, said prefix request means also requests acquisition of Domain Name Server (DNS) server information from said home agent, and
   wherein said prefix transfer means forwards the acquired DNS server information along with said prefix to said mobile terminal having moved to the visited network.

7. A gateway equipment, installed in a visited network containing a radio communications device for communicating with a mobile terminal, for forming an interface with a home network containing a home agent for holding location information on said mobile terminal, the mobile terminal using a first home address in the home network, said gateway equipment comprising:
   a prefix acquisition request means for requesting acquisition of a prefix for said mobile terminal having moved to the visited network from said home agent in response to an access request from said mobile terminal having moved to the visited network; and
   a prefix transfer means for receiving the requested prefix from said home agent and forwarding the received prefix to said mobile terminal having moved to the visited network;
   wherein the prefix is used, by said mobile terminal, to generate a second home address of said mobile terminal having moved to the visited network, wherein said prefix request means makes a prefix acquisition request and a Domain Name Server (DNS) server information request to said home agent, and wherein said prefix transfer means forwards the acquired DNS server information along with said prefix to said mobile terminal having moved to the visited network.

8. A gateway equipment according to claim 7, further comprising:

decision means for deciding whether or not authentication processing using a source address for the access request from said mobile terminal having moved to the visited network is required; and authentication means for starting authentication processing of said mobile terminal having moved to the visited network when said decision means decides that authentication is required, wherein said prefix request means makes a request to said home agent to acquire the prefix of said mobile terminal having moved to the visited network after said authentication was successful.

9. A gateway equipment according to claim 8, further comprising:

location information holding means for holding information of a location of said mobile terminal having moved to the visited network, wherein said authentication means starts said authentication processing after receiving a location registration request from said mobile terminal having moved to the visited network for said location information holding means.

10. A gateway equipment according to claim 9, wherein said location information holding means holds location information of said mobile terminal having moved to the visited network after said authentication was successful.

11. A communication method in a communication system including a home network installed with a home agent for holding mobile terminal location information of a mobile terminal, a visited network installed with a radio communication device for communicating with a mobile terminal, and gateway equipment in said visited network for forming an interface with said home network, the mobile terminal using a first home address in the home network, said communication method comprising:

forwarding, by said radio communication device, an access request from said mobile terminal having moved to the visited network to said gateway equipment;

making, by said gateway equipment, an acquisition request to said home agent for a prefix for said mobile terminal having moved to the visited network and forwarding an acquired prefix to said mobile terminal having moved to the visited network; and creating, by said mobile terminal having moved to the visited network, a second home address based on said prefix acquired from said gateway equipment, searching a Domain Name Server (DNS) terminal and forwarding a packet addressed to said mobile terminal having moved to the visited network by registering mapping information along with said second home address generated from said prefix and a mobile terminal identification information in a DNS server within a relay network or home network, making, by said gateway equipment, a DNS server information acquisition request and a prefix request to said home agent, and forwarding said acquired DNS server information and identifier to said mobile terminal having moved to the visited network.

12. A communication method according to claim 11, further comprising:

deciding, by said gateway equipment, whether or not authentication processing is required using a source address of the access request from said mobile terminal having moved to the visited network;

starting, by said gateway equipment, the authentication processing for the mobile terminal having moved to the visited network when it is decided by said deciding step that authentication is required; and requesting, by said gateway equipment, acquisition of a prefix for said mobile terminal from said home agent after the authentication was successful.

13. A communication method according to claim 12, further comprising:

holding, by said gateway equipment, the location information of said mobile terminal having moved to the visited network; and starting, by said gateway equipment, said authentication processing after receiving a location registration request from said mobile terminal having moved to the visited network.

14. A communication method according to claim 13, further comprising:

holding, by said gateway equipment, said mobile terminal location information after said authentication was successful.

15. A communication method according to claim 11, further comprising:

acquiring, by said mobile terminal, having moved to the visited network said prefix from said gateway equipment and creating a second home address for said mobile terminal having moved to the visited network, and registering mapping information, with said second home address generated from said prefix and said mobile terminal identification information, in a DNS server within a home network, or a visited network or relay network.

16. A communication method according to claim 11, wherein said communication system further includes a network management equipment connected to said home network and said visited network, wherein said home agent and said gateway equipment acquire programs and data from said network management equipment required for distributing the prefixes and authenticating mobile terminals.

17. An authentication method for a mobile terminal used in a communication system which includes a home network installed with a home agent for holding mobile terminal location information of a mobile terminal, a visited network installed with a radio communications device for communicating with a mobile terminal, and gateway equipment in said visited network for forming an interface with said home network, the mobile terminal using a first home address in the home network, wherein said radio communication device forwards an access request from said mobile terminal having moved to the visited network to said gateway equipment, said authentication method comprising:

making, by said gateway equipment, an acquisition request to said home agent for a prefix for said mobile terminal having moved to the visited network, forwarding an acquired prefix to said mobile terminal having moved to the visited network, and authenticating said mobile terminal, wherein the prefix is used, by said mobile terminal, to generate a second home address in said mobile terminal having moved to the visited network, wherein along with making a prefix acquisition request, said gateway also requests acquisition of Domain Name Server (DNS) server information from said home agent, and wherein said gateway forwards the acquired DNS server information along with said prefix to said mobile terminal having moved to the visited network.

18. An authentication method according to claim 17, further comprising:

deciding, by said gateway equipment, whether or not authentication processing is required using a source address of the access request from said mobile terminal having moved to the visited network, and performing, by said gateway equipment, authentication processing when it is decided that authentication is necessary.

19. An authentication method according to claim 18, further comprising:

holding, by said gateway equipment, the location information of said mobile terminal having moved to the visited network, and performing, by said gateway equipment, authentication processing after receiving a location registration request from said mobile terminal having moved to the visited network.

20. An authentication method according to claim 18, further comprising:

holding, by said gateway equipment, said mobile terminal location information after said authentication was successful.

21. An authentication method for a mobile terminal used in a communication system which includes a home network installed with a home agent for holding mobile terminal location information of a mobile terminal, a visited network installed with a radio communications device for communicating with a mobile terminal, and gateway equipment in said visited network for forming an interface with said home network, the mobile terminal using a first home address in the home network, wherein said radio communication device forwards an access request from said mobile terminal having moved to the visited network to said gateway equipment, said authentication method comprising:

making, by said gateway equipment, an acquisition request to said home agent for a prefix for said mobile terminal having moved to the visited network, forwarding an acquired prefix to said mobile terminal having moved to the visited network and authenticating said mobile terminal having moved to the visited network;

acquiring, by said mobile terminal having moved to the visited network, said prefix from said gateway equipment and creating, by said mobile terminal, a second home address for said mobile terminal having moved to the visited network; and registering mapping information, with said second home address generated from said prefix and a mobile terminal identification information, in a Domain Name Server (DNS) server within a home network, or a visited network or relay network, wherein along with making a prefix acquisition request, said gateway equipment also requests acquisition of Domain Name Server (DNS) server information from said home agent, and wherein said gateway equipment forwards the acquired DNS server information along with said prefix to said mobile terminal having moved to the visited network.

22. An authentication method according to claim 17, wherein said communication system further includes a network management equipment connected to said home network and said visited network, wherein said home agent and said gateway equipment acquire programs and data from said network management equipment required for distributing the prefixes and authenticating mobile terminals.

* * * * *